Dec. 3, 1957     L. R. B. HERVEY     2,814,851
KERATIN TREATING PROCESS AND PRODUCTS THEREOF
Filed Dec. 11, 1953     8 Sheets-Sheet 1

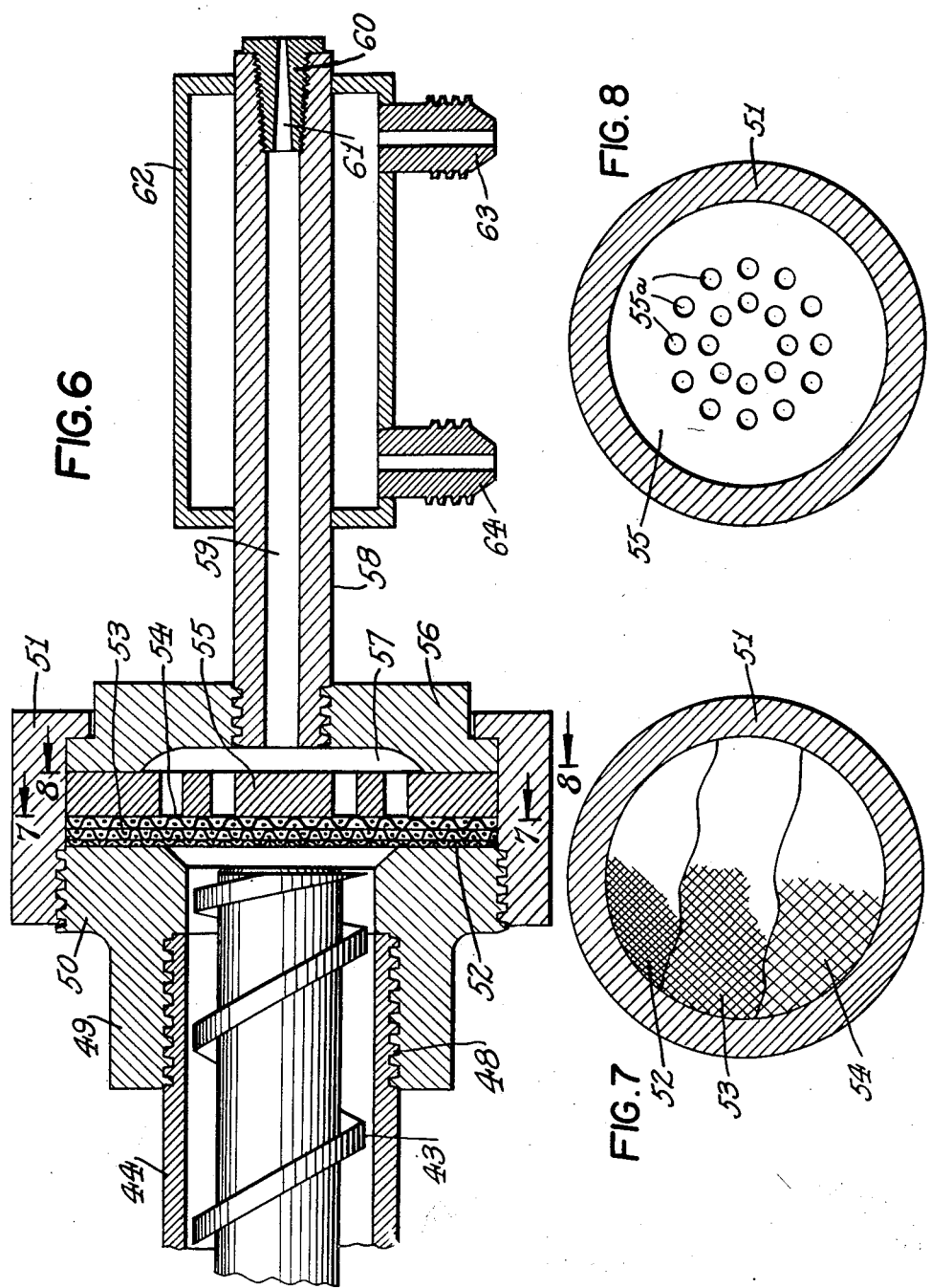

FIBER A

FIBER B

FIBER C

FIBER OF INVENTION

United States Patent Office 2,814,851
Patented Dec. 3, 1957

2,814,851

KERATIN TREATING PROCESS AND PRODUCTS THEREOF

Laurence R. B. Hervey, Concord, Mass., assignor, by mesne assignments, to Rubberset Company, Cleveland, Ohio, a corporation of Ohio Application December 11, 1953, Serial No. 397,746

52 Claims. (Cl. 28—82)

The present application is a continuation-in-part of my co-pending application, Serial Number 50,648, filed September 22, 1948, now abandoned.

This invention relates to the treatment of keratin derived from natural sources to render the same useful for the production of various articles by extrusion. It relates particularly to the production of solutions of keratin from which fibers may be spun and filaments extruded and to improved methods of spinning and extruding such solutions. Also, it relates to the new or improved products resulting from such treatment and operations.

Heretofore no commercially practicable method has been found for forming a spinnable or extrudable solution of keratin derived from its natural sources, such as poultry feathers, and chicken feathers in particular, hair, animal horns and hoofs, wool, hog bristles and the like. While solutions of keratin from such sources have heretofore been formed, such solutions have been unsatisfactory for spinning or extrusion due to one or more of various factors. In the course of dissolving the keratin in accordance with prior art practices, the product has usually been so degraded that it is unsatisfactory for spinning or extrusion purposes. Also, the solutions have usually been too dilute or have lacked the required "length" for spinning purposes. Homogeneous, concentrated, extrudable solutions of substantially undegraded keratin have, in fact, not been attained prior to this invention. When attempts have heretofore been made to form more concentrated solutions it has not been possible to separate the solution from the insoluble fraction of the source material. Consequently, when attempts have been made to spin the mixture of dissolved and undissolved fractions of such concentrated solutions, the resulting fibers have been found to be too weak for practical use due to the presence of the insoluble fraction which acts as a filler in the regenerated soluble portion. Moreover, the retention of certain constituents of the original material, such as certain metals and the like, as will be explained hereinafter, slows up the extrusion rate below practical limits and serves to make the resulting fibers excessively brittle. They cannot be sufficiently drawn, at the time of extrusion, to eliminate or reduce the brittleness.

An important object of the invention has been to produce solutions of keratin in which keratin is degraded to a minimum extent and which solutions are highly satisfactory for extrusion or formation into fibers, filaments, films and other shapes and articles having commercially desirable properties.

Another important object of the invention has been to produce comparatively concentrated solutions of keratin in a suitable solvent from which the keratin may be directly extruded into long filaments which may be stretched at the time of extrusion to provide a product which has great tensile strength and which is not brittle.

A further object of the present invention has been to provide a method by which such keratin solutions may be readily spun or extruded into fibers capable of being drawn to produce various desirable characteristics, such as resilience and others present in natural wool or other natural or artificial fibers or filaments.

An additional object of the present invention has been to provide fibers, filaments and other shapes and articles of keratin having superior properties to those products heretofore obtained.

Corollary to the foregoing, it has been another object to provide an economical and commercially feasible process of forming spinnable or extrudable solutions and of spinning and regenerating the solutions and to form a new or highly improved form of keratin fiber.

The foregoing objects have been attained by the employment of a two stage process, in which each stage is of essential importance. In Stage One natural keratin-containing material, such as chicken feathers, is heated with a solvent for the keratin in the presence of a reducing, disulfide-splitting agent, which aids in extracting certain portions of the keratin. The resulting keratin solution is then separated from the insoluble fractions and the extracted keratin is precipitated on cooling, is separated, and dried. In Stage Two the keratin obtained from Stage One is treated with a solvent for the keratin, and preferably with a keratin-solubilizing agent, which solvent is different from that of Stage One in that it is capable of producing a homogeneous, translucent, highly concentrated, stringy solution or dispersion of keratin which is suitable for spinning or extrusion, when heated, into fibers or filaments. The fibers or filaments extruded or drawn from this heated solution are treated to remove the solvent and then may be tanned, cured, tempered and dried.

The above enumerated objects, as well as other objects, together with the advantages of the inventions, will be readily comprehended by persons skilled in the art upon reference to the following description, taken in conjunction with the annexed drawings.

Figure 1:
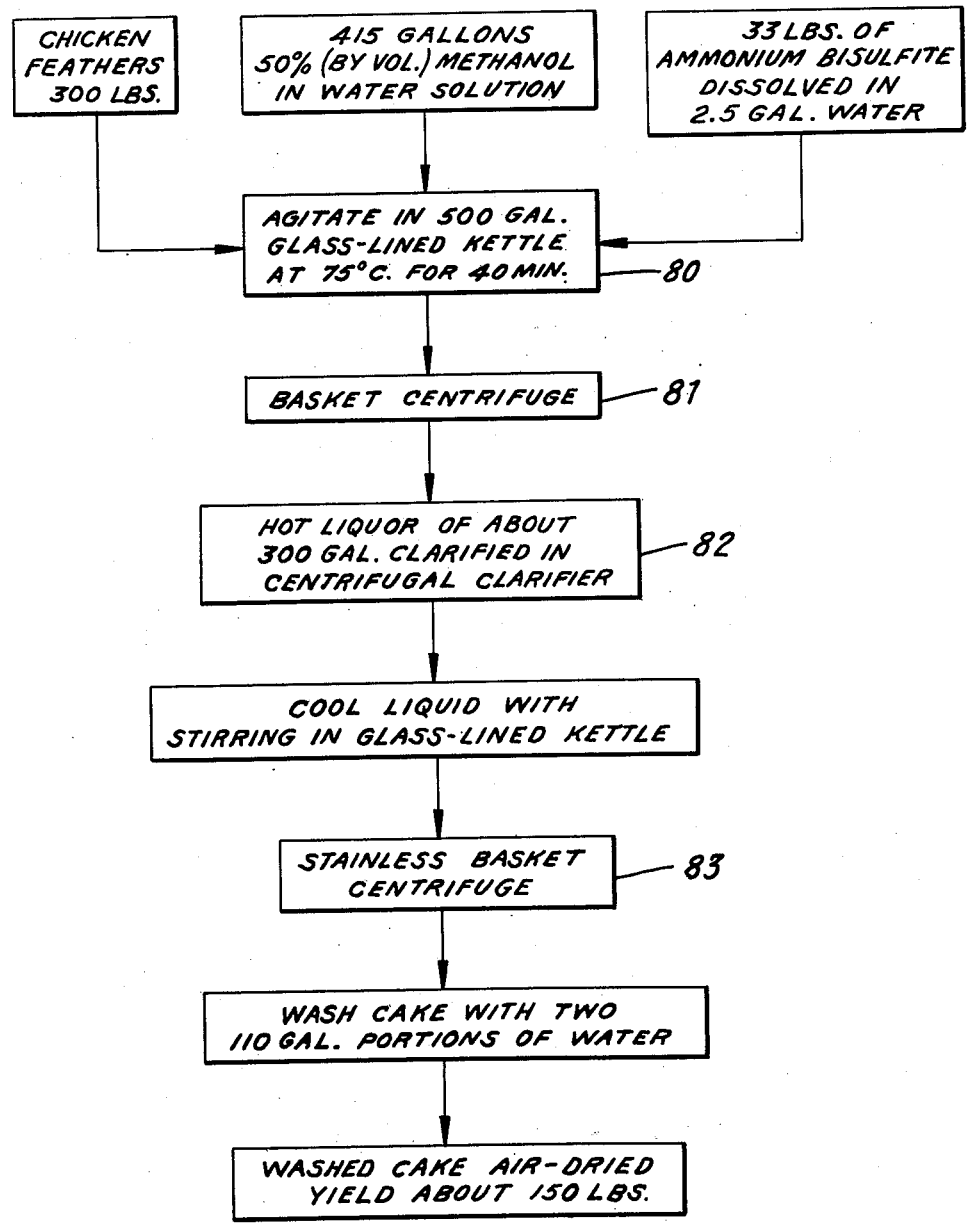
Figure 1 is a flow diagram of the first stage of a preferred form of the process by which keratin is extracted from the original raw source material, such as chicken feathers, and is brought to a state satisfactory for use in the second stage.
Figure 2:
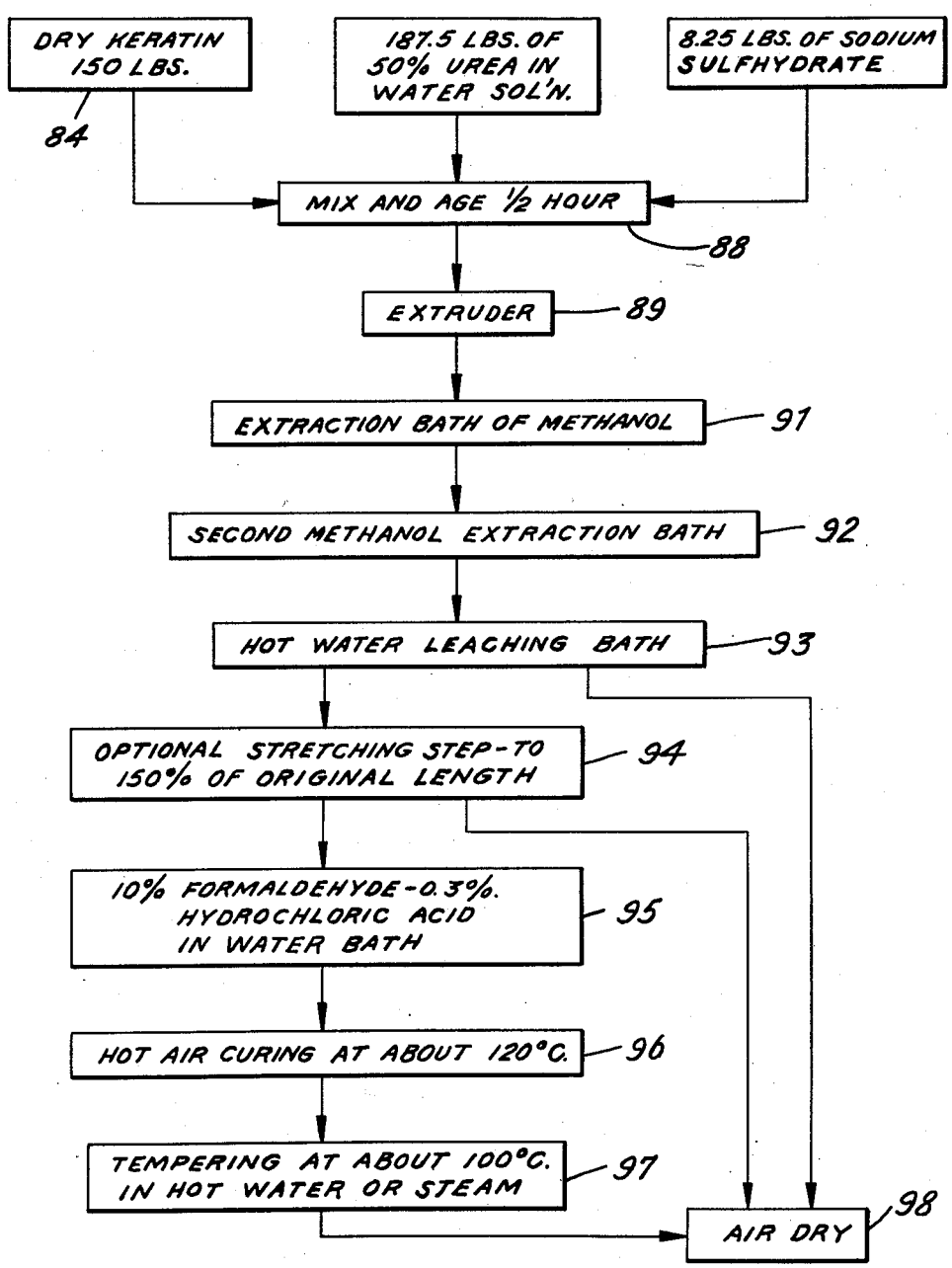
Figure 2 is a flow diagram of the second stage of the process by which the partially modified and extracted keratin obtained from the first stage of the process (Figure 1) is dissolved to form a concentrated, extrudable or spinnable solution and is extruded to form the desired filaments which are then treated in accordance with the remaining steps indicated in this diagram.
Figure 3:
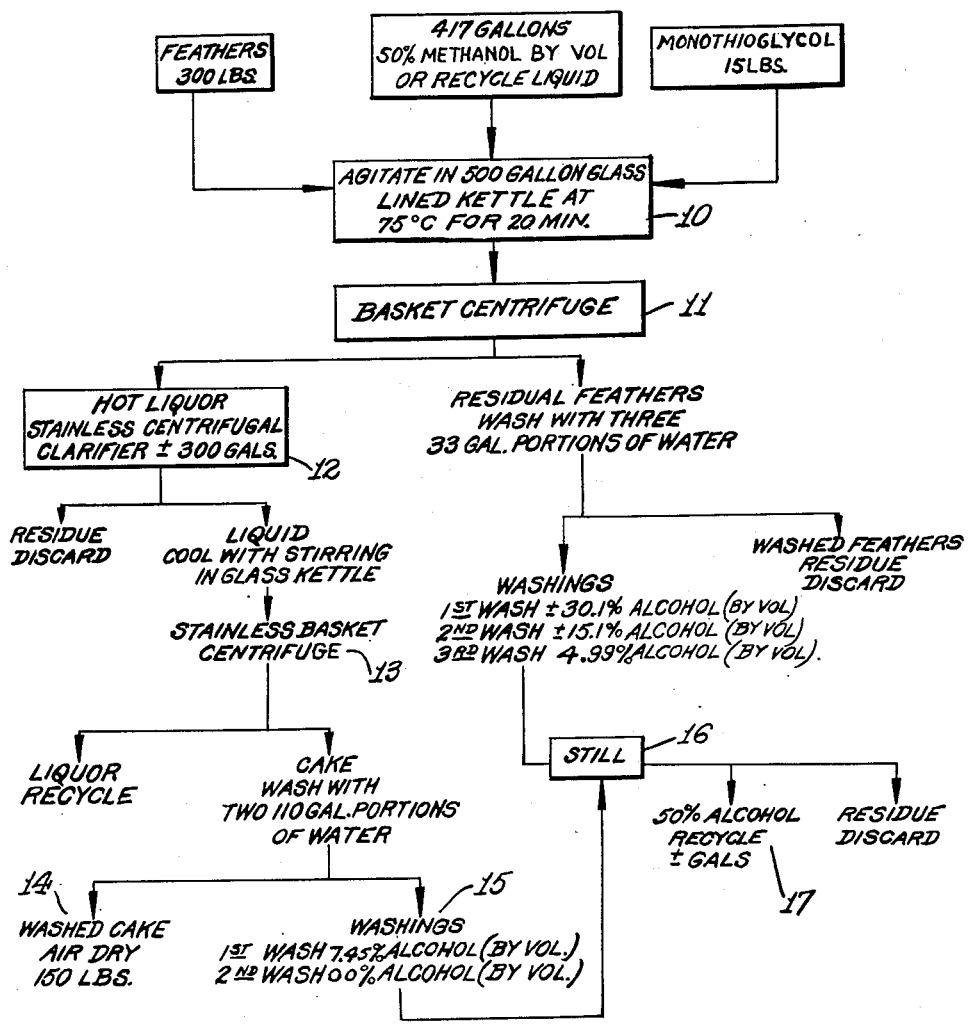
Figure 4:
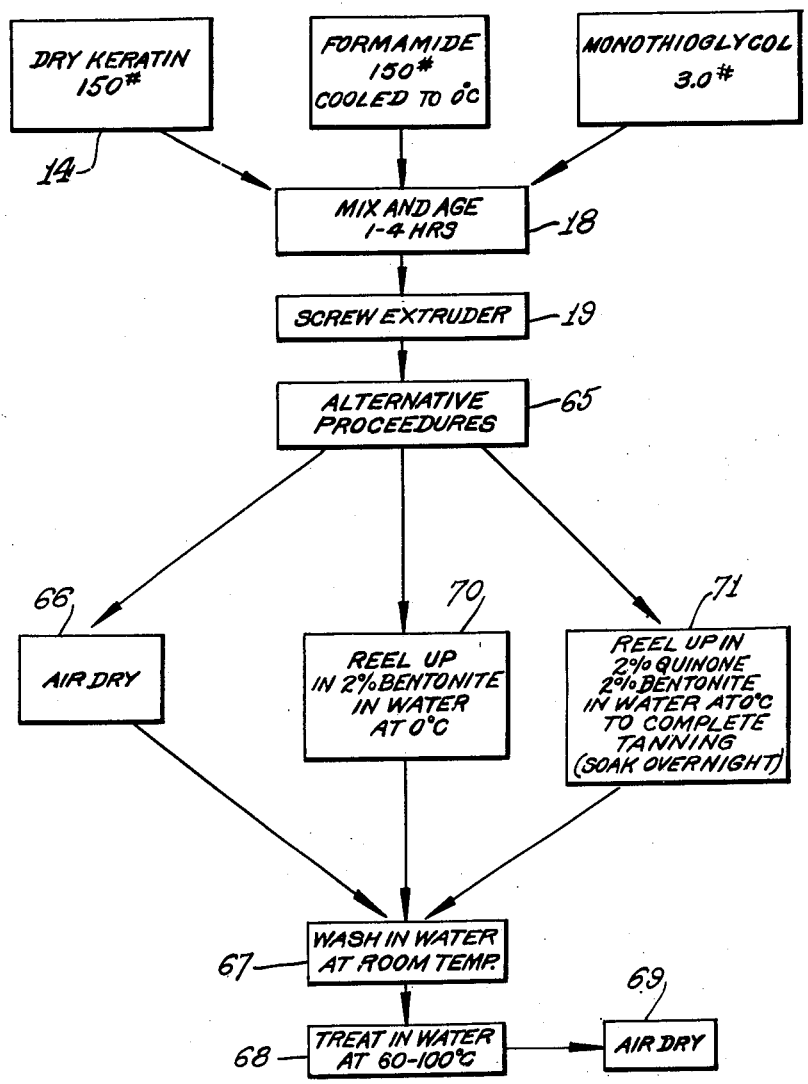

Figures 3 and 4 are similar to Figures 1 and 2, respectively, differing from Figures 1 and 2 in that different agents are used to treat the keratin and certain modifications in the process are employed.

Figure 5:
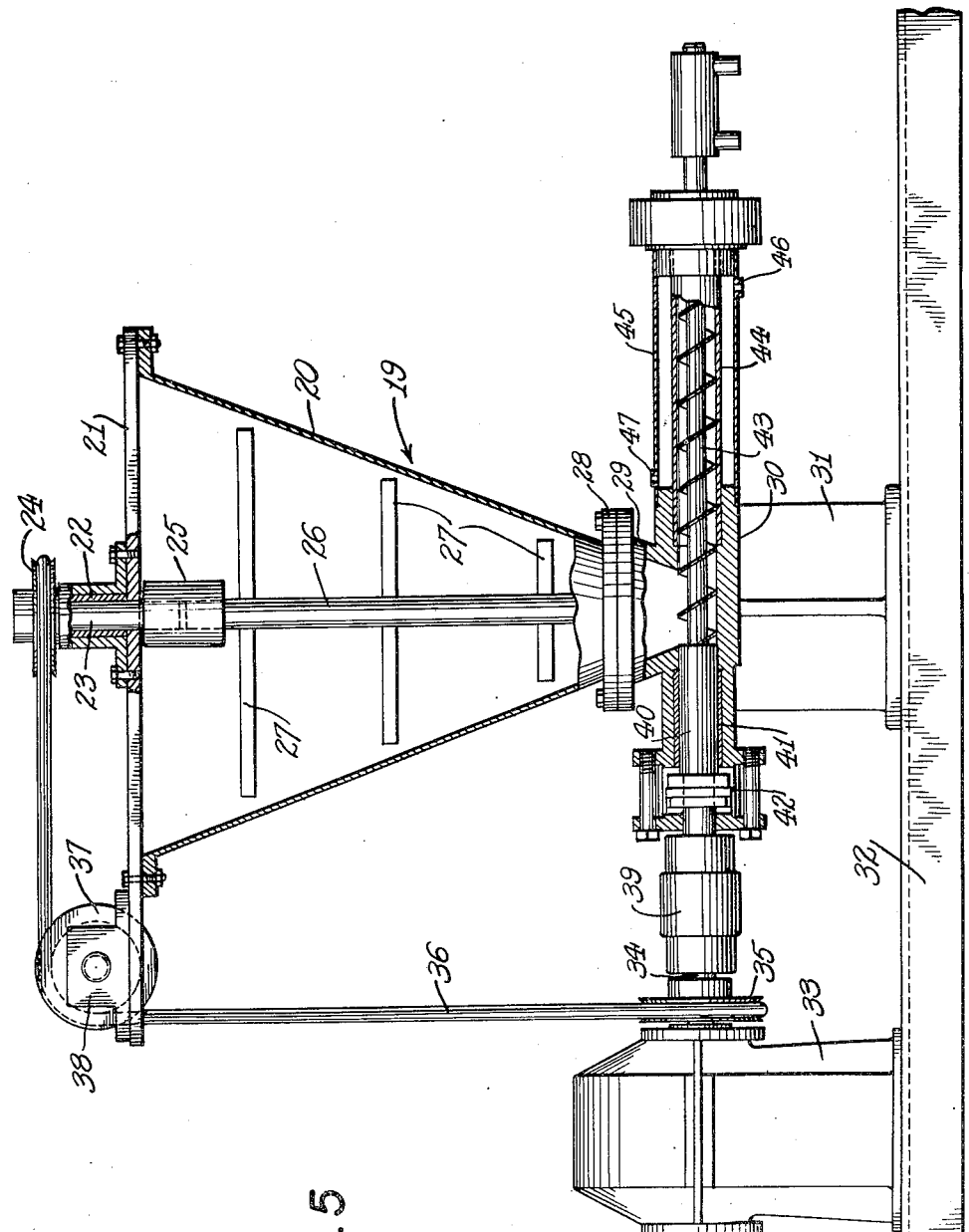

Figure 5 is a view, partly in elevation and partly in vertical section, showing suitable apparatus which may be used in carrying out certain of the steps of the second stage of the process preliminary to and for the extrusion of the fibers.

Figure 6 is an enlarged detail view in longitudinal section through suitable devices at the right end of Figure 5 which may be employed for extruding the concentrated keratin solution to form fibers or filaments.

Figure 7 is a detail view, on a slightly reduced scale, in section along the line 7—7 of Figure 6, with parts of certain screens broken away.

Figure 8 is a detail view, on a slightly reduced scale, in section along the line 8—8 of Figure 6.

Figure 9:
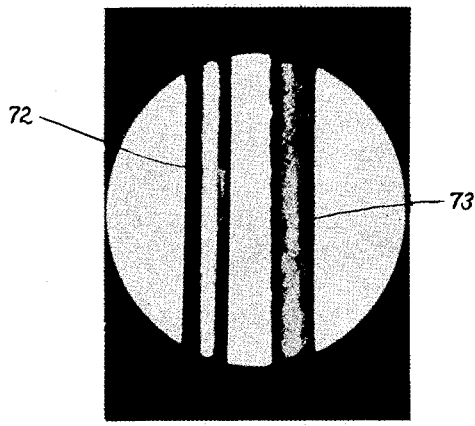

Figure 9 is a photomicrograph of a keratin filament produced in accordance with the invention and of a keratin filament produced by another process.

Figure 10:
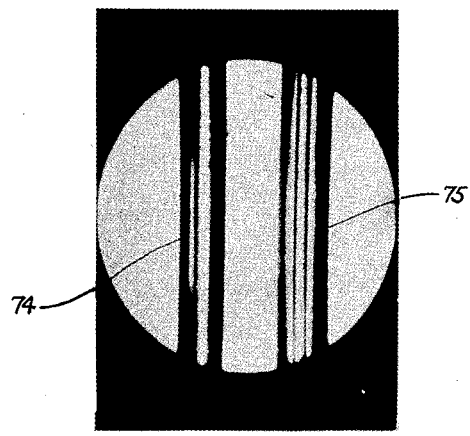

Figure 10 is a similar photomicrograph serving to compare a keratin filament produced in accordance with the invention with a glass fiber.

Figures 11, 12, 13 and 14 are photomicrographs showing the cross-sectional appearance of various keratin filaments, one produced in accordance with the invention and the others produced by other processes.

While I do not wish to be bound by any theory as to why the method herein disclosed produces the results sought, my discoveries point to the fact that an important consideration leading to the success of my process is the removal or inactivation of various metals present in the original material. It has been found that measurable and fairly substantial quantities of certain metals are present in keratin source materials, including chicken feathers, such as aluminum, calcium, chromium, copper, iron, magnesium, manganese, lead and zinc. This has been shown by spectro-chemical analyses. The precise quantities of each metal present will naturally vary to a certain extent, but quantitative analyses of various chicken feathers have definitely shown the presence of copper, iron, aluminum and zinc. Lesser amounts of silver, boron, potassium, lithium, sodium, nickel, phosphorus, silicon and titanium also are present.

Small quantities of certain of the metals seem desirable to give strength, stiffness, resilience and other desirable properties to the final fibers. But experiments have shown that the copper, iron, aluminum and zinc are present in the original material in greater quantities than permissible for proper extrusion of the keratin solutions into the desired fibers. In fact, it seems desirable to reduce the quantity of all polyvalent metals below their original contents present in the starting material. These metals may, if desired, be eliminated or inactivated as far as possible in forming the final spinning solutions and then there may be added such quantities of certain of them as may be desired to impart the required tensile strength, stiffness and resilience to the final fibers. This may be done, for example, by passing the fibers, after they are spun, through a bath in which ions of the desired metals are present.

In forming the spinning or extrusion soltuion of keratin it appears to be necessary to break certain of the —S—S-bonds present in the original keratin molecules. Yet this should be done in such a way as not to unduly degrade the material. It is highly desirable to avoid breaking down the molecules excessively so that the regenerated material forming the fibers will be of relatively high molecular weight. The breaking of the —S—S- bonds is accomplished by suitable reducing, disulfide- splitting agents. Additionally, it appears necessary to release the metals indicated from their linkage with the protein molecules. This, it has been found, may be done most effectively by forming stable salts or other compounds from the metals so as to prevent them from recombining by way of cross-linking the protein molecules.

It has been found that the reducing, disulfide-splitting agents, a class of reagents with which those skilled in the art are familiar and which will be discussed in greater detail hereinbelow, serve both of the functions above indicated. They serve as a reducing agent to break the —S—S-bonds and they combine with the metals to form complexes which are stable and thus serve to sequester the metals and prevent them from cross-linking the keratin molecules.

With certain of the reducing, disulfide-splitting agents it is often advantageous to use an additional reagent to aid in the partial removal or inactivation of the polyvalent metals. For example, when one of the sulfite type of disulfide-splitting agents, such as sodium bisulfite and sodium metabisulfite, is employed, hydrogen sulfide or carbon bisulfide may be suitably used also. Good results have been obtained through the use of from about 1% to 10%, by weight, of the quantity of sulfite-containing material employed.

Other reagents which improve the keratin when used in similar small percentages in conjunction with the sulfite type of disulfide-splitting agents but which do not appear to produce a keratin suitable for spinning or extrusion when used by themselves, are: (a) dimethyl glyoxime, (b) silver sulfate, (c) unsymmetrical dinaphthyl p-phenylene diamine, (d) mercurous nitrate, and (e) potassium thiocyanide. Of these, (a), (c) and (e) combine readily with metals and apparently form stable compounds therewith, while (b) and (d) combine readily with proteins and serve to displace the metals therefrom. At the same time (b) and (d), being monovalent, are incapable of cross-linking with or in the protein molecules. It has been observed, in this connection, that mercuric nitrate, which is divalent, does not produce a marked improvement in the plasticity of the solution, as does mercurous nitrate.

An indication of the deleterious effect of an excessive amount of copper in the spinning solution was given by the introduction of copper into the keratin to the extent of 40 parts per million based upon the dry weight of the keratin. This was found to prevent completely the extrusion of satisfactory filaments. The plasticity of the spinning solution was so reduced that the extrusion rate became too slow. Moreover, it prevented drawing of the fibers after extrusion, which is desirable for the elimination of excessive brittleness.

Dealing with the description of the process of my invention, I will begin by describing Stage One. In Stage One, I prefer to first extract the keratin from the naturally-occurring source materials. In this first step or extraction step, I desire to limit as much as possible the degradation of the extracted kerain. Desirably, the extraction accomplishes the splitting and chemical reduction of the disulfide linkages, with a minimum of degradation to the remainder of the keratin molecule, accompanied by a sequestering of some of the metal ions present, as explained hereinabove. The extraction of that portion of the naturally-occurring source material which may be solubilized is accomplished by treatment of the keratin source material with a reducing, disulfide-splitting agent and an alcohol-water solution.

The alcohol-water solution may be employed in an amount of about ten to fifteen times the weight of the keratin source material. The alcohol used should contain not more than four carbon atoms and said alcohol may form from about 20% or 25% to 60% of the alcohol-water solution, by weight. It has been found advantageous to use a 50% ethyl alcohol-in-water solution.

The reducing, disulfide-splitting agent may be used in quantities varying over a substantial range. The preferred quantity is from about 3% to 25%, by weight, of the natural keratin-containing material to be treated. The optimum quantity of reducing agent appears to be approximately 5%, by weight, of natural keratin source where chicken feathers are used as the source of keratin and monothioglycol is used as the reducing, disulfide- splitting agent. Where sodium metabisulfite ($Na_2S_2O_5$) is used as the reducing agent, about 5% to 15%, based upon the weight of dry chicken feathers, is preferred and best results are obtained with about 11% of sodium metabisulfite. The optimum quantity of these agents may vary somewhat depending upon the agent used and upon the source of keratin.

The reducing, disulfide-splitting agent used may be either of the organic chemical type (non-ionic type) or of the inorganic chemical type (ionic type). Representative of the organic reducing, disulfide-splitting agents are organic compounds containing the thiol group as the active moiety of the compound. Examples of such compounds are monothioglycol (mercaptoethanol), thioglycollic acid and thioglycerol. Monothioglycol is the preferred agent of this group. Thioglycollic acid is only moderately active and not as effective as monothioglycol.

The so-called inorganic type of reducing, disulfide-splitting agents are typified by compounds having the sulfur-containing anions, sulfite and bisulfite. The bisulfites give the best results obtained thus far and ammonium bisulfite is particularly effective. The bisulfite and sulfite disulfide-splitting agents may have organic or inorganic cations. The inorganic cations are preferably selected from the alkali-metals, such as sodium, potassium or lithium or from the alkaline-earth metals, such as calcium, barium or strontium. It is intended to classify the ammonium ion as one of the alkali-metals. Barium, strontium and magnesium give less desirable results and are therefore not preferred. However, other cations which form salts with the sulfite and bisulfite ions may be used provided the cation is not incompatible with the other materials used in the process. The organic cations which may be used are exemplified by the organic amines, such as n-butylamine, ethanolamine, triethanolamine, ethylamine, dimethylamine, etc.

I have also found that nascent hydrogen may be used effectively as a reducing, disulfide-splitting agent.

Another type of inorganic reducing, disulfide-splitting agent which may be used is the sulfhydrate type. The sulfhydrates are characterized by the sulfhydrate radical ($-SH^-$). The sulfhydrate radical is considered to be essentially of an ionizable nature as differentiated from the organic thiol type of compounds, as exemplified by the mercaptans, since such compounds do not ionize to any appreciable extent. Both the sulfhydrates and the mercaptans have the —SH grouping, but one may consider the sulfhydrates as analogous to the basic hydroxides, whereas the mercaptans or thiol type compounds are analogous to the alcohols.

When the sulfhydrates are used to extract keratin from the source material, the extraction mixture is usually substantially more alkaline than are the mixtures obtained by employing other reducing, disulfide-splitting agents. As a consequence of this higher alkalinity, the sulfhydrates may produce greater degradation of the keratin. For this reason, the sulfhydrates are not as desirable as the other reducing, disulfide-splitting agents in the extraction step or Stage One of the process.

As contemplated for purposes of the present invention, I prefer to use a sulfhydrate prepared from a base having a dissociation constant equal to or greater than $1 \times 10^{-5}$ and which are reasonably soluble in, and which will ionize in, the solvents prescribed for use according to the present invention. These sulfhydrates may have either inorganic or organic cations; however, in any event, the sulfhydrate compound should be prepared from a base having a dissociation constant in excess of $1 \times 10^{-5}$.

Among the sulfhydrates of inorganic cations which may be used in the process of the present invention are those in which the basic cation is an alkali-metal, such as sodium, potassium and lithium. For purposes of definition I wish to include the ammonium ion with the alkali-metals. Sulfhydrates of the alkaline-earth metals such as calcium, strontium and barium may be used. The sulfhydrates of strontium, barium and magnesium are not as desirable as that of calcium, for they produce less satisfactory results.

Among the organic bases which will produce satisfactory sulfhydrates and which have an ionization constant in excess of $1 \times 10^{-5}$ are the aliphatic primary amines, including the primary aliphatic alkanolamines. These include propylamine, butylamine, isopropylamine, benzylamine, mono-ethanolamine and mono-propanolamine. This classification also includes the primary aliphatic polyamines, such as triethylene-tetramine, diethylene-triamine and ethylene-diamine. Also the secondary aliphatic amines and heterocyclic nitrogenous bases may form suitable sulfhydrates. These include such secondary aliphatic amines as diisopropylamine, diethylamine and diethanolamine.

Included among the secondary heterocyclic nitrogenous bases which are satisfactory are such heterocyclic amines as piperazine, piperidine and morpholine. Morpholine is not as reactive as the other heterocyclic amines and is less desirable as a sulfhydrate.

The tertiary alkanol amines, such as triethanolamine and tripropanolamine also form satisfactory sulfhydrates. Some of the aliphatic tertiary amines are basic enough to have a dissociation constant greater than $1 \times 10^{-5}$ and are thus satisfactory as sulfhydrates for this reason. One of such amines is triethylamine. The quaternary ammonium sulfhydrates have been found to be particularly satisfactory. As examples of this group are tetramethylammonium sulfhydrate and tetraethylammonium sulfhydrate.

For all practical purposes, the aromatic amines are not satisfactory as they do not have a large enough dissociation constant to form sulfhydrates.

Certain other bases, which are not properly classified as amines, have dissociation constants in excess of $1 \times 10^{-5}$ and, therefore, their sulfhydrates are satisfactory for use in the invention. Examples of such compounds are phenylhydrazine and guanidine sulfhydrates.

One of the inorganic type of reducing, disulfide-splitting agents which is particularly advantageous for use in the extraction step to aid in removal of the keratin from the source material is ammonium bisulfite. This compound is particularly effective in enhancing the extraction of the keratin. Thus smaller quantities of reagent may be used. Amounts of ammonium bisulfite as little as 3% by weight of the source material may be used without noticeable diminution of yields of extracted keratin. Amounts greater than 5% do not appear to enhance the yields. However, amounts of ammonium bisulfite in excess of 5% of the weight of source material produce an extracted keratin of higher quality which has been found to be more easily extruded.

When ammonium bisulfite is used as the reducing, disulfide-splitting agent in the extraction step, it is not necessary to use any reducing, disulfide-splitting agent in the subsequent extrusion or spinning step which will be described hereinbelow. This is an additional advantage which accrues from the use of this particular agent in the extraction step. The employment of hydrogen sulfide in addition to the ammonium bisulfite is particularly beneficial where it is desired to eliminate the need of a reducing, disulfide-splitting agent in the extrusion step. The fibers or filaments obtained from keratin which has been extracted by the action of both ammonium bisulfite and hydrogen sulfide are of excellent quality. The hydrogen sulfide may be conveniently introduced into the extraction mixture by bubbling hydrogen sulfide gas through the mixture.

Ammonium bisulfite is available commercially only in the form of aqueous solutions, such as a 30% solution. These solutions are comparatively unstable and consequently it is often advantageous to prepare the aqueous solution just prior to use by bubbling the theoretical weight of sulfur dioxide into a solution of ammonium sulfite to convert it to ammonium bisulfite. Alternately, one may use theoretical quantities of aqueous ammonia and sulfur dioxide. The latter method is particularly satisfactory.

Where ammonium bisulfite is used as the reducing, disulfide-splitting agent in the extraction of the keratin, the control of the pH is a matter of some importance if optimum yields of partially modified keratin are to be obtained. For most efficient yields, the pH of the extraction solution before the extraction of keratin from the source material should desirably fall within the range of about 2.5 to 8.5, and preferably should be about 5.7.

Where any bisulfite type reagent is used as the reducing, disulfide-splitting agent in the extraction step, the pH of the extraction solution which contains the extracted keratin is desirably adjusted to about 3.0 to 5.0, and preferably to about 4.5 at the time of precipitation of the keratin.

The pH may be adjusted by the addition of an acid or base in accordance with accepted practices until the desired pH is obtained.

If desired, a mixture of two or more reducing, disulfide-splitting agents may be used to assist in the extraction of the keratin from the natural material in which it occurs.

The following considers in some detail one method of extracting the keratin from the source material, accompanied by a reducing, disulfide-splitting action, with a minimum of degradation of the keratin itself, which has been found to be advantageous (reference being made to Figures 1 and 3 of the appended drawings):

A source of keratin, such as chicken feathers, is mixed with about 10 to 15 times its weight of a 20% to 60% by weight alcohol-in-water solution and about 3% to 25% of its weight of a reducing, disulfide-splitting agent in a closed vessel which is formed or lined with an inert material, such as glass. The mixture is desirably heated to a temperature of about 70° to 80° C., and preferably about 75° C. However, higher temperatures, up to about 120° C. may be used providing the extraction mixture is placed under pressure to prevent loss of the alcohol and water. Care must be taken not to maintain the extraction mixture at the elevated temperatures longer than necessary in order to minimize decomposition of the keratin. The mixture is agitated at the elevated temperature as shown at 80 and 10 for a period of about 20 to 40 minutes. Care is exercised not to permit access of oxygen to the mixture in the course of this treatment. This may be accomplished by introducing an inert atmosphere, such as nitrogen, into the mixing vessel. It is preferable that the system be closed at all times to prevent loss of volatile materials.

Upon completion of the extraction of keratin, the mixture is centrifuged or otherwise strained to remove the undissolved fractions of the source material as shown at 81 and 11. Preferably the insoluble fraction is washed with fresh alcohol-water mixture to remove as much as possible the retained liquid, which is then combined with the solution that has passed through the centrifuge. It has been found that the solution or liquor contains about 50% of the original keratin, although in a number of operations it was found to contain anywhere between 40% and 60% or slightly higher. The hot liquid separated from the residue in the centrifuge is delivered to a stainless steel centrifugal clarifier 82 or 12 having a suitable capacity. Here certain of the residue carried over from the basket centrifuge will be separated out and discarded. The clear liquid is delivered to a glass-lined kettle and before permitting the liquid to cool the pH is desirably adjusted to between about 3 to 5 or preferably between about 4 to 5, and optimally about 4.6 which appears to be approximately the isoelectric point of the protein.

On cooling of the liquor, the keratin becomes almost insoluble in the alcohol-water mixture and is precipitated as a cheese-like gelatinous mass in which the water and alcohol are loosely held. This gelatinous mass is passed into a stainless steel basket centrifuge 83 or 13 which serves to remove the greater part of the liquor from the precipitate which is retained within the basket and becomes caked along its wall. The caked keratin mass is then washed with two portions of distilled or deionized water. The washed cake representing partially modified keratin is then dried.

The wash water, used to remove the remaining liquor from the keratin cake, may be collected as indicated at 15 (Figure 3), and is delivered to a still 16. The water from the first washing may contain about 7% alcohol by volume, whereas that from the second washing will contain little, if any, alcohol. The latter may, therefore, be discarded, if desired, in lieu of sending it to the still.

Where the keratin is to be used promptly in the preparation of filaments or fibers, it is not necessary to reduce the keratin to a substantially dry state, providing the keratin contains no more water than is compatible with the extrusion mixture or interferes with the mechanics of the preparation of the extrusion mixture. However, if the keratin is to be stored for substantial periods of time it is desirable to convert the keratin to a substantially dry state, in which condition it will be stable during storage at room temperature for considerable periods of time.

The drying operation may be carried out in any suitable way. For example, the keratin may be spread out in a thin layer and a fan used to blow air over the material. After about 12 to 16 hours the keratin is substantially dry. Drying may be desirably carried out under vacuum and the product so obtained appears to be of improved quality. It has been found desirable to reduce the time of exposure to oxygen and to light to as short a time as feasible. It has been found that keratin prepared in this manner and reduced to a substantially dry condition may be stored in closed containers for long periods, at room temperature, until it is ready for further processing.

Returning now to the residue discharged from the basket centrifuge 11, as shown in Figure 3, this is preferably washed with about three portions of water to recover the alcohol held by this fraction. The first wash will be found to contain approximately 30% alcohol by volume, the second wash about 15% alcohol by volume, and the third wash about 5% alcohol by volume. These washings are preferably sent to the still 16 for recovery of the alcohol which may be recycled to the kettle 10. The residue from the still 16 and also the residue from the washed feathers may be discarded.

Indicative of the slight degree of degradation which the keratin produced by the extraction of Stage One of the process has undergone, is the fact that this material is almost completely insoluble even in concentrated aqueous alkali solutions. It is contemplated that the keratin shall be modified from its original state but remain substantially undegraded or only slightly degraded at all steps of the present process from beginning to end. This high degree of insolubility in alkali is a function of high molecular weight of the modified keratin product. The relatively slight degradation of the keratin itself is one of the important features of the present invention. Most of the prior art attempts to prepare suitable keratin filaments or fibers were unsuccessful because of excessive degradation.

Thus far the discussion has related to Stage One of my process. The discussion will now turn to Stage Two. This stage starts with the keratin obtained from Stage One and there is prepared therefrom a continuous or homogeneous stringy, translucent mass in the form of a concentrated dispersion or solution of the keratin substantially undegraded or only very slightly degraded in a solvent. While this mass may be a concentrated colloidal dispersion or a solution, the term "solution" will be used hereinafter for the sake of convenience. This mass, when heated, becomes extrudable and may be converted into filaments by means of hot melt extrusion. The preparation of the extrudable solution involves subjecting the keratin to the action of a solvent for the keratin, and optimally, and in most cases preferably, to a keratin solubilizing agent, both of which materials will be described in some detail below.

The concept of producing a comparatively concentrated solution of the keratin which may be directly extruded into a filament or fiber is believed to be particularly novel to the present invention and is quite unlike the thin solutions of highly degraded keratin of the prior art.

In order to produce an extrudable or spinnable solution of keratin, it is necessary to subject the keratin to the action of an organic nitrogen-containing solvent, desirably characterized by the presence of an $NH_2$ group, in which the modified keratin is soluble, at least at elevated temperatures, and from which it may be suitably spun or extruded. The organic nitrogen-containing solvents may be used in substantially anhydrous form or they may be used in mixture with suitable proportions of water. The more important of these nitrogen-containing solvents may be said to be amides or imides and it is preferred to use those amides and imides in which the nitrogen provides a substantial proportion of the molecular weight of the solvent material. One manner in which this preference may be exercised is to use a nitrogen-containing solvent of comparatively low molecular weight or one which has a plurality of amido or imido groups.

Among the nitrogen-containing solvents from which keratin may be extruded are the mono-, di- and tri-ammonia substituted analogs of formic acid, their esters, and their alkyl and alkanol substituted derivatives. These analogs are those derived by displacing one or more of the three substituents on the carbon atom of formic acid with ammonia. The ester group may be attached through the hydroxyl group of the formic acid molecule. The alkyl and alkanol substituents are desirably substituted in place of the hydrogen atom of formic acid although they may be substituted on the ammonia substituents. The alkyl and alkanol substituents should not exceed four carbon atoms when taken together. In the case of guanidine, which is the tri-ammonia analog of formic acid, it is preferable that there be no further substituents on the compound.

Some of the particularly effective solvents for the purpose of the present invention may be defined as those represented by the formula

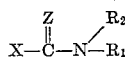

wherein X is a member of the group consisting of hydrogen, alkyl and alkanol groups containing not more than three carbon atoms, $-NR_3R_4$, $-OR$, wherein R is an alkyl group containing not more than three carbon atoms, and the group

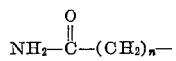

wherein $n$ is the integer one or two. The groups $R_1$, $R_2$, $R_3$ and $R_4$ are members of the class consisting of hydrogen, alkyl and alkanol groups which when taken together shall contain not more than four carbon atoms. Z is either oxygen or $=NH$, but preferably oxygen. Examples of such effective solvents are acetamide, ethanol formamide, diethanol formamide, monoisopropanol formamide, diethyl formamide, formamide, dimethyl formamide, N-mono-ethyl acetamide, n-proprionamide, n-butylamide, urethane, guanidine, ethanol urea, methyl urea, urea, and the amides and imides of dibasic acids containing not more than five carbon atoms, such as succinimide and malonamide. The preferred solvents are formamide and urea.

A more specific type of nitrogen-containing solvent which may be used in preparing a spinnable or extrudable solution of the keratin is that represented by the following formula

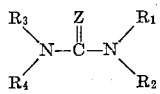

wherein the R groups are hydrogen, alkyl and alkanol groups which when taken together shall not contain more than four carbon atoms. Z is a member selected from a group consisting of oxygen and $=NH$. Examples of such satisfactory solvents are urea, methylurea, ethanolurea, N-mono-n-butylurea and guanidine. When guanidine is employed it is normally introduced as the acid addition salt, preferably as the hydrochloride.

That group of extrusion solvents which has been found to be particularly effective includes those amides having less than four carbon atoms or mono- or di-alkyl- or alkanolamides, the acyl radicals of which have less than four carbon atoms, and the alkyl or alkanol groups of which have not more than four carbon atoms. In specifying alkyl- or alkanolamides in the foregoing, it should be understood that either may be present as mono- or di-substituents and that combinations or complexes of the two may be employed.

In those cases where the nitrogen-containing solvent, such as urea or urethane, is a solid at room temperature, it is also contemplated that the solvent may be employed in a substantially anhydrous condition. In such a case the extrusion solution of keratin will be prepared at such elevated temperatures (about 150° C. or slightly higher) as will effect a melting of the urea, urethane or other nitrogen-containing solvent and also the solvation of the keratin. Such solid solvents are preferably intimately pre-mixed with the keratin before feeding into the extruder.

The solvent for the keratin may be one of the nitrogen-containing solvents per se in a substantially anhydrous condition or mixtures thereof or, if desired, these solvents may be employed in the form of a solution of the nitrogen-containing solvent dissolved in water. The use of a water diluent in conjunction with the nitrogen-containing solvents has certain advantages particularly in that the cost of producing formed keratin articles may be substantially reduced. It has been discovered that water in substantial amounts may be used to supplant in part the nitrogen-containing solvents described hereinabove in preparing an extrudable or spinnable keratin solution. In addition to the economy provided, the use of water also permits effective use of nitrogen-containing solvent materials which are solids at room temperature, since a more intimate mixture and homogeneous solution is obtained through the use of a liquid solvent composition.

The quantity of water which may desirably be used to augment the nitrogen-containing solvent will vary somewhat depending upon the nitrogen-containing solvent selected. When water is included in the solvent, at least enough water is desirably mixed in with the nitrogen-containing solvent to provide a homogeneous aqueous solution free from suspended materials. It will be understood, however, that with certain normally liquid solvents, such as formamide, no water is required and, in fact, it is desirable to use the solvent in anhydrous form. When aqueous solvents are employed, it is generally desirable not to exceed that concentration of nitrogen-containing solvent which will provide a saturated solution. Also, it is not desirable to use excessive amounts of water in preparing the solvent for the keratin as the solubility of the partially modified keratin diminishes as the water content of the aqueous solvent composition increases and it is important that a highly concentrated solution of keratin be formed. The maximum amount of water desirable for best results is about 60% by weight of the total aqueous solvent composition used to dissolve the keratin prior to extruding or spinning the solution.

Illustrative compositions of aqueous solvent solutions which have been found to be satisfactory for preparing an extrudable or spinnable keratin solution according to the present invention are the following (expressed in terms of percent by weight of nitrogen-containing solvent in the aqueous solvent solution):

|  | Percent |
|---|---|
| Formamide | 50 to 100 |
| Urea | 40 to 50 |
| Urethane | 35 to 100 |
| Acetamide | 35 to 60 |

A convenient composition of aqueous solvent for the keratin is one having approximately equal quantities by weight of nitrogen-containing solvent and water.

It is preferable to use equal quantities of solvent and keratin in preparing the extrusion mixture.

In preparing a suitable extrudable or spinnable solution of the keratin, the concentration of the keratin in the solvent may vary somewhat depending upon the nature of the solvent. When substantially anhydrous, nitrogen-containing solvents are used to dissolve the keratin, it has been found advantageous to add enough of keratin to comprise approximately 40% to 60% of the solution to be extruded. Where an aqueous solvent mixture containing the nitrogen-containing solvent dissolved in water is used, lower concentrations of keratin may be used. Thus, for example, when a solvent for the keratin is used which contains 50% by weight of urea in water it has been found posssible to use from about 30% to 50% by weight of the keratin in the extrusion mixture. Smaller amounts of keratin than 30% may be used in a 50% urea in water solution but this requires the use of special extrusion techniques. For preferred results with the use of the extrusion method contemplated by the present invention it is desirable to use a solution containing about 45% keratin where a 50% by weight of urea in water solution is used as the solvent and about 50% by weight where anhydrous formamide is used as the solvent. In general, I prefer to employ approximately equal quantities of keratin and solvent.

As stated above, the solvent may be one or more of the substantially anhydrous nitrogen-containing solvents described hereinabove, or it may contain water in the amounts prescribed. There may additionally be added coloring dyes or pigments to impart a suitable color to the extruded or spun article. One particular formulation which has been found to be satisfactory is the following:

|  | Parts by weight |
|---|---|
| Keratin | 1,000 |
| Formamide | 1,000 |
| Sodium sulfhydrate | 58.5 |
| Carbon black | 10 |

In preparing the extrusion solution, it is optional, and in some cases preferable, to use a keratin solubilizing agent. This agent may be one of the organic thiol and sulfhydrate types of reducing, disulfide-splitting agents described hereinabove in connection with Stage One of the process. In those cases where the keratin produced in Stage One was extracted with the aid of an organic type of reducing, disulfide-splitting agent or ammonium bisulfite, either no keratin solubilizing agent is necessary in producing the extrusion solution, or one may optimally use one of the organic thiol or sulfhydrate types of reducing disulfide-splitting agents. In the event that the keratin was extracted in Stage One of the process with the aid of an alkaline-earth metal or alkali-metal bisulfite other than ammonium bisulfite, it is necessary to use a keratin solubilizing agent in preparing the extrusion solution which is a sulfhydrate type reducing, disulfide-splitting agent.

If one of the alkaline-earth metal or alkali-metal bisulfites (but excluding ammonium bisulfite) is used in the extraction step of Stage One and one of the organic thiol type of reducing, disulfide-splitting agents is used in preparing the extrusion mixture, it is desirable to use one of the additional reagents described hereinabove, such as hydrogen sulfide or carbon bisulfide, in connection with these bisulfites in the extraction step. The reasons for the necessity of taking such measures is not entirely understood.

In those cases where one of the organic thiol type reducing, disulfide-splitting agents, such as monothioglycol, is used in preparing the extrusion solution, it is desirable to adjust the pH of the extrusion mixture to between about 4.7 and 5.6. This adjustment is made by adding an acid or base to the mixture in accordance with practices well known to those skilled in the art. When the so-called inorganic type of reducing, disulfide-splitting agents are used it is not necessary to make any pH adjustments.

The use of the sulfhydrate type of reducing, disulfide-splitting agent in the preparation of the extrusion mixture has been found to be particularly advantageous. For example, a filamentous product is obtained having superior "in process" strength. Since the filaments produced during the course of the process are desirably stretched or at least pulled over reels and the like, it is important that the extruded filaments have sufficient strength to resist breaking during such processing operations. Breaking during the processing usually entails costly delays while adjustments are made.

The use of the sulfhydrates provides other important advantages. Keratin solutions which are not thermosetting and which do not plug an extruder orifice or other small opening, are obtained when a sulfhydrate is used in the preparation of the extrusion mixture. This is an important advantage since shutdowns are required much less frequently to remove and clean clogged extruders. When the extrusion solution is formed through the use of an organic thiol, it is thermosetting in the heated zone of the extruder.

For preferred results, in preparing the extrusion solution it is desirable that the keratin solubilizing agent be soluble in the solvent used to dissolve the keratin. However, complete solubility of the agent used in the solvent is not essential so long as it is reasonably soluble when the solution is heated to a higher temperature such as that at which the filaments or fibers are extruded or spun.

The amount of keratin solubilizing agent employed may vary considerably, but I have found that amounts varying from about 1.5% to 7% of the weight of the keratin used in the extrusion mixture provide the most desirable results. When sodium sulfhydrate is used in conjunction with the solvation of the keratin in the solvent, it is desirably employed in a quantity of from about 3% to 7% based upon the weight of the keratin used. The preferred quantity is about 5.5%. When other sulfhydrates are employed, chemically equivalent quantities calculated by well-known chemical methods are used.

The preferred process of preparing the extrusion mixture of extruding the keratin filaments or fibers and of subsequently treating these filaments or fibers will be described in some detail hereinbelow with reference to Figures 2 and 4 of the appended drawings:

The components are mixed together at approximately room temperature, i. e., about 20° to 27° C. Preferably the temperature during mixing should not exceed 38° C. and where an aqueous solvent mixture is used in preparing the mixture, the temperature should not fall below that at which the nitrogen-containing component of the solvent mixture will precipitate or crystallize from the solution. For best results, the solvent for the keratin, such as the urea or formamide, should be fluid and homogeneous at all times.

If an organic thiol type of keratin solubilizing agent, such as monothioglycol, is used in prepared the extrusion mixture, the pH of the mixture should be adjusted to between 4.7 and 5.6, and preferably to about 5.2, if the pH does not already fall within this range. This adjustment is effected by adding an acid or an alkali as required. If the pH is not so adjusted, the filaments on extrusion will be dull and they cannot be satisfactorily drawn.

The order of addition of the components of the mixture is not critical. However, it is preferred to dissolve the keratin solubilizing agent in the solvent and to subsequently add the resulting solution to the keratin taken from storage, as indicated at 84 (Figure 2) or 14 (Figure 4). Mixing as at 88 or 18 shall desirably take place in a mixer equipped to handle doughby masses, such as the well-known heavy-duty, double arm mixer. The mixture is agitated and kneaded in the mixer until a sticky mass is produced, which upon aging may set up as a rubbery mass.

During the mixing, the solution may, if desired, be cooled to a temperature of about 5° C. (although not low enough to permit the freezing or crystallization of any of the components). This cooling acts to retard the reaction between the components and thereby permits a longer mixing time, thus increasing the uniformity of the mix and as a consequence permitting greater ease in drawing of the filaments. Optionally, the keratin powder and the solvent components may be pre-cooled before mixing.

After the extrusion mixture or solution has been thoroughly mixed, it is usually aged by permitting it to stand for a period of time. It is preferably comminuted or chopped into relatively small pieces several times during this aging period. The aging step is an important one because the character of the mix changes rapidly during the first hour or so after mixing. The aging period permits the stabilization of the mixture as a result of permitting equilibrium to be attained. The aging period should be at least one-half hour in duration and preferably longer, such as for about 2 hours and up to about 4 hours. During the aging of the mix, its comminution or subdivision several times at about half hour intervals provides optimum results. If the total aging time is less than an hour and a half the subdivision should be effected at shorter intervals, but not following each other too closely as this heats up the mixture and reduces its extrudability.

The comminution of the mass which forms the final "crumb" to be extruded may be accomplished by passing the mixture through any of various comminuting machines with which the art is familiar or by forcing the material through screens of progressively diminishing mesh size. Preferably the granules or lumps forming the comminuted mass will have a major dimension of between about ⅛ and ⅜ of an inch. After aging and successive comminution, the "crumb" which is obtained may be stored until required for extrusion. For storage over longer periods of time, it is desirable to store the "crumb" at refrigerated temperatures and in the absence of oxygen.

After aging, the extrusion mixture or "crumb" is placed in an extruder 89 or 19. The extruder is optionally, but desirably, of the type permitting compression while the material is kept cold, i. e., below —5° C. and preferably at about —50° C., until any entrapped air is eliminated, and a clear, transparent, solid solution is formed. This may be accomplished, for example, by the use of a screw type extruder having the extruder barrel enclosed in a jacket through which a cooling fluid may be circulated. As will be described in greater detail in discussing the extrusion apparatus, there may be attached to the end of the extruder barrel a chamber in which the solid solution is forced through a fine screen (150 mesh) preferably of stainless steel. This chamber is desirably maintained at a temperature of about —50° C.

The solid solution is then forced into a heated passage of the extruder and thence into a spinnerette head or orifice from which fibers, filaments or other shapes may be obtained. At the time of spinning or extruding it is desirable to increase the temperature of the "crumb" or mix prepared from a non-aqueous solvent composition, such as anhydrous formamide, to a temperature of above 115° C. and preferably about 125° to 130° C. up to 150° C. Where an aqueous solvent composition is used in preparing the "crumb" or mix, such as a 50% urea-in-water solution, a lower temperature is desirable, such as about 110° C. The temperature of spinning or extruding may vary substantially depending somewhat upon the viscosity of the fluid. The lower temperature for a mix or "crumb" obtained through the use of an aqueous solvent is dictated somewhat by the fact that it is necessary to minimize the flash evaporation of water upon extrusion. If excessive flashing is permitted at the time of extrusion, due to the rapid conversion of the water to steam, the rapid evolution of steam may destroy the continuity of the fibers or filaments. The temperature of extrusion may be attained by passing the "crumb" or mix through passages having a progressively increasing temperature until the desired temperature for extrusion is reached.

The rate of extrusion of the "crumb" through the spinnerette head may vary over a substantial range. The optimum rate will depend upon such factors as the dimensions of the orifices of the spinnerette head, the temperature, and the nature and composition of the extrusion mix.

The extrusion mixture is thermosensitive in character and it should remain in the heated zone as short a time as practical, since otherwise it may lose its stringy properties which are so important. In connection with the alleviation of this problem, it is advantageous to limit the volume capacity of the steam-jacketed heating zone of the extruder to a minimum so that it will be capable of heating the mixture to the desired temperature in a relatively short period of time.

After extrusion, it is desirable to stretch or draw the self-supporting filaments or fibers as they emerge from the extrusion apparatus and while they are still hot to about 16 times or more of their original length. In one operation the filaments were drawn to such an extent that their length was increased to 100 times their original length with desirable results. This drawing of the filaments is advantageous, since the resulting orientation of the molecules serves to improve the flexibility of the filaments.

After drawing, the filaments are preferably passed through a bath or series of baths which will extract components of the solvent for the keratin as well as excess amounts of keratin solubilizing agent. The bath will also desirably condition the fibers or filaments to prevent them from sticking to each other or to objects with which they come in contact. While this treatment may be effected in a number of ways, the preferred method will be described in connection with Figure 2 of the drawings. This method first involves passage of the drawn filaments through a bath 91 (Figure 2) comprising an alkanol compound having not more than 4 carbon atoms. Methanol appears to be the most satisfactory material for this bath. It is preferably anhydrous. It is also desirable to have in the bath a material which will prevent sticking together of the filaments. Excellent results have been obtained with the use of bentonite. It has been found that a mixture of 500 grams of bentonite suspended in 7 gallons of methanol will provide satisfactory results. The methanol serves to cool and coagulate the filaments, while the bentonite prevents the continuous filaments from sticking or fusing together. Optionally, the filaments may be passed through a second methanol bath 92 which may not contain bentonite.

After passing through the "anti-stick" bath 91 described above, the continuous filaments produced from the extrusion may be then passed through a water spray or a water bath 93 which is preferably hot and thence into a tanning bath 95. In some cases I find it desirable to again stretch the filaments to about 150% of the original length of the coagulated filaments prior to the tanning step. This is indicated at 94 in Figure 2. The tanning of the filaments or fibers serves to improve their water resistance. This is accomplished by passing the filaments, after they have been stretched to about 150% of their original length, through a tanning bath of a lower aldehyde-acid solution. I prefer a formaldehyde-hydrochloric acid bath. The preferred concentrations are about 10% formeldehyde and 0.3% hydrochloric acid in water. The minimum concentration of formaldehyde for satisfactory results is about 8%. As one exceeds a concentration of 10% the results obtained are less satisfactory.

After passing through the tanning bath, the filaments may be passed through a hot air oven 96 heated to about 120° C. to cure them. The filaments are then desirably tempered by passing them through a boiling water bath 97 or a steam bath and subsequently they are air dried at 98.

Optionally, as will be described in connection with Figure 4 of the appended drawings, the drawn fibers may be treated to remove the extrusion solvent by other alternative procedures as shown at 65. The filament may be coiled or looped in the form of a skein and then air dried, as indicated at 66. After drying, to remove remaining traces of solvent and water until not more than 5% water remains, the filament is washed in water at room temperature 67. It is then tempered by treatment in water at an elevated temperature of between 60° and 100° C., as indicated at 68. This treatment may continue for about 10 minutes. The filament is then air dried at 69 and reeled. While the filament is still hot and as it is being dried and reeled, it is subjected to sufficient tension to straighten it.

In lieu of the first air drying step 66 mentioned above, the extruded and drawn material may be reeled up, as indicated at 70, in a 2% suspension of bentonite in water at 2° C. Following this the treatments indicated at 67, 68 and 69 with respect to the first procedure may be followed.

As a further alternative, the extruded and drawn material may be reeled up in water containing 2% quinone and 2% bentonite at 0° C., as indicated at 71, and allowed to soak for a period of 8 to 12 hours to complete the tanning of the keratin. This may be followed by the treatments indicated at 67, 68 and 69 with regard to the first procedure.

Summarizing the nature of the invention, it has been found that keratin fibers and filaments may be extruded and drawn from a solution of keratin derived from a variety of available sources. For best results it has been found desirable to combine a number of steps, conditions and other factors, as set forth above. It is essential to the success of the process and product to combine some of these and highly advantageous to employ all. They may be briefly summarized as follows:

(1) Treatment of the original keratinous source material to separate the readily soluble portions from those more difficultly soluble. This step involves, preferably, the use of 50% methyl alcohol in water to the extent of about 10 to 15 times the weight of the source material. In lieu of methyl alcohol, other alcohols containing not more than 4 carbon atoms may be employed and the alcohol may form anywhere between about 20% and 60% of the alcohol-water mixture, by weight.

(2) Use of a relatively small amount of an agent or agents capable of breaking the —S—S-bonds of the keratin molecules by a reducing action and capable of combining with the metals of the keratin to form stable compounds therewith apart from the molecular structure of the keratin. This reducing, disulfide-splitting agent may be employed to the extent of from about 3% to 25%, preferably from about 5% to 10% of the weight of the keratin-containing material being dissolved.

(3) Separation, by centrifuging or otherwise straining and filtering, of the solubilized fraction from the insoluble portion of the source material. When chicken feathers are used as the source material the solubilized fraction contains between 40% and 60% of the original keratin.

(4) Coagulation of the solubilized fraction after adjusting the pH to about 3 to 5 and recovery of keratin therefrom. The recovered keratin is preferably placed in a substantially dry condition if it is to be stored before further treatment. If the keratin is substantially dry (containing not more than 5% and preferably about 3% water) it may be stored for long periods of time at room temperature in the absence of oxygen until it is ready for processing.

(5) Formation of a concentrated solution of the recovered keratin in a nitrogen-containing solvent from which the keratin may be extruded, and optionally with a relatively small amount, about 2% to 7% of the weight of the keratin, of a keratin solubilizing agent.

(6) Optionally, cooling the keratin and the extrusion solvent preliminary to step 5 to a temperature of about 5° C.

(7) If a keratin solubilizing agent of the organic thiol type is used in step 5 above, and the pH of the solution is not within the range 4.7 to 5.6, adjusting the same by the addition of either an acid or an alkali as required to bring it within this range and preferably to 5.2.

(8) If fibers or filaments are to be produced from the solution, compressing the latter, desirably at a temperature below —5° C. and preferably of about —50° C., to eliminate air and then heating it to a temperature of above 110° C., before forcing it through an extrusion nozzle or spinnerette.

(9) Drawing down the filaments, while still hot to such an extent that their length is increased a number of times the length of the fibers issuing from the extrusion nozzle or spinnerette.

The extrusion apparatus used to produce filaments of keratin in accordance with the process of the present invention may vary somewhat in construction depending upon the materials used in the process and the specific operational details of the process practiced. The more desirable extrusion apparatus is equipped with a compression screw or plunger to compress the extrusion solution. Optionally, the compression area of the extruder may be equipped with a cooling jacket to provide cooling of the solution undergoing compression. The apparatus is also desirably equipped with screens to break up any lumps of undissolved material or to prevent their passage into the extrusion area of the apparatus. At the discharge end of the apparatus it is provided with an extrusion head or spinnerette through which the concentrated solution of keratin may be forced to form filaments. For the formation of filaments the keratin or extrusion solution must be heated to a temperature of about 110° C. or above if satisfactory results are to be obtained. To heat the keratin solution to this temperature, the apparatus should be equipped with a heating source, such as a heating jacket through which a heating fluid may be passed or electric resistance wires may be placed around the tube or conduit through which the solution is delivered to the extrusion nozzle or spinnerette, to heat the solution to the desired temperature. I have found one type of apparatus to be particularly satisfactory. This apparatus will be disclosed by the description which follows in connection with Figure 5 through 8 of the appended drawings:

The extruder 19 may comprise a conical hopper 20 having a top support 21 secured thereto. A bushing 22, carried centrally of the support 21, provides a bearing for a shaft 23, the upper end of which carries a pulley 24. At its lower end the shaft 23 extends into the hopper and is connected by a coupling 25 with a shaft 26 carrying a series of agitator blades or arms 27. The lower and smaller diameter end of the hopper is provided with a flange 28 which is secured, by bolts or the like, to the top of a screw feed unit 29. The latter has a transversely extending conduit 30 in communication with the lower end of the feed hopper. A support 31 for the feed screw unit may be mounted on a table or platform 32 which also supports a speed reducing unit 33 adapted to receive power from any suitable source, such as an electric motor, not shown. Power is delivered from the speed reducer by means of a shaft 34 to which is secured a pulley 35 cooperating with a belt 36. The latter extends upwardly to and around a pair of pulleys 37 which are journaled in bearings 38 carried by the top support member 21 of the hopper. Belt 36 is connected with the pulley 24 and serves to supply the necessary power for operating the agitator blades 27.

A flexible shaft coupling 39 serves to connect the shaft 34 with a shaft 40 of the feed screw unit. Shaft 40 is journaled in a bushing 41 carried by member 30. A thrust bearing unit 42, of any suitable construction, is provided to take the end thrusts of the feed screw. The latter, which is integrally connected with the shaft 40, is indicated at 43 and extends axially through the member 39 and a tubular extension 44 thereof. Around the extension 44, and spaced slightly therefrom, is a jacket 45 adapted to receive a cooling liquid which is introduced through a fitting 46 and discharged through a fitting 47. The arrangement is desirably such that the material delivered through the hopper to the feed screw is cooled to or maintained at a temperature below —5° C. and preferably of about —50° C. in its passage through the tubular extension 44. Preferably the material is precooled prior to introduction into the hopper 20 so that its temperature need not be depressed greatly and the major function of the cooling medium circulated through the jacket 45 is to maintain the material at a temperature of between —5° C. and —50° C.

At its outer end, the tubular extension 44 is provided with external screw threads 48 adapted to receive internal threads on a member 49. The latter, by way of illustration, may suitably be an octagonal nut of about 2⅛ inch dimension across the flats. An enlarged portion 50 of this nut is provided with external screw threads arranged to receive a pipe union nut 51. The latter has an inwardly turned lip at its outer end arranged to squeeze various screening and straining elements against the end of portion 50. Preferably the unit comprises a screen 52 of about 150 mesh, a second screen 53 of about 50 mesh, and a third screen 54 of about 10 mesh. These screens are followed by a backing plate 55 having a series of passages 55a therethrough arranged in two circles, as best shown in Figure 6. To close the outer end of the chamber formed by the nut 51, a plate 56 is provided, this being forced firmly against the backing plate and the latter being forced against the screens by the lip or flange of nut 51.

The closure element 56 is preferably provided with a recess 57, of saucer-like configuration, forming a small chamber into which the material squeezed through the screens and the openings 55a is passed and deflected toward the center. Element 56 is provided with a central discharge aperture which is screw threaded to receive a tube 58 which, in the illustrative device, may suitably be of ½ inch diameter and provided with an axially extending bore 59 of say a #11 drill. At the outer end of the tube 58 there is inserted an extrusion nozzle or a spinnerette 60 having external screw threads cooperating with internal threads on the tube 58. A tapered passage 61 extending through the extrusion nozzle may, by way of example, taper from a 0.09 inch diameter at its inlet and to a 0.040 inch diameter at its discharge end. If desired the extrusion nozzle may be provided with a plurality of such tapered passages so that a plurality of filaments may be formed simultaneously. All of the parts of the extruder which come in contact with the keratin solution are preferably formed of or lined with stainless steel, or other material resistant to the corrosive action of water and the solvents employed.

Around the tube 58 is mounted a casing 62 having an inlet 63 and an outlet 64 arranged to provide for the circulation through the chamber of superheated steam. The arrangement is such that as the dissolved keratin is forced through the passage 59 its temperature is raised quickly from its initial temperature of about —50° C. to above 115° C. and normally about 125° C. This should occur within 5 to 10 seconds. It has been found that if the material is maintained at an elevated temperature, around 120° C., for more than 12 seconds, it tends to lose its stringy character and can no longer be properly extruded or spun to produce satisfactory filaments.

It is desirable that where equipment comes into contact with keratin that the surface of the equipment shall not give up metallic ions to the keratin. Glass and stainless steel provide suitable surfaces for this purpose. It is also advantageous to exclude air and other sources of oxygen at all steps of the process where the keratin is treated at elevated temperatures. This may be accomplished in any suitable way, such as by the use of an inert atmosphere or by the expulsion of air from within and around the material prior to and in the course of such treatments or by using the reaction zones to their full capacities, or the like. Where a sulf-hydrate is used in the process it is desirable to perform the extruding or spinning operation in a closed vessel or chamber to prevent loss of hydrogen sulfide or other volatile components.

While any of the naturally occurring sources of keratin described hereinabove may be used after being subjected to the action of the reducing, disulfide-splitting agent, animal horns and hoofs and wool are less desirable for employment as the source of keratin because they are recalcitrant to extraction and produce filaments which are comparatively brittle. It is preferred to use poultry feathers, and chicken feathers in particular, for they are readily available at low cost and produce an excellent filament when prepared in accordance with the process of the present invention.

In order more clearly to disclose the nature of the present invention, specific examples illustrating the preparation of the novel products and the conduct of the novel processes of the invention will now be described. It should be understood, however, that this is done solely by way of example and is intended neither to delineate the scope of the invention nor limit the ambit of the appended claims. The numbers in parentheses refer to the reference numerals in the attached drawings.

*Example 1*

Keratin was obtained by treating a natural source of keratin with a reducing, disulfide-splitting agent as follows (the reference numerals apply to Figures 1 and 2 of the drawings):

About 300 pounds of chicken feathers were mixed with about 415 gallons of a 50% (by volume) methanol in water solution. About 33 pounds of ammonium bisulfite dissolved in 2½ gallons of water were added, the pH was adjusted to about 5.7, and the resulting mixture was agitated in a 500-gallon glass-lined kettle at 75° C. for 40 minutes (80). The kettle was closed to exclude air and the system was swept by the introduction of an inert atmosphere, such as nitrogen, prior to the introduction of the foregoing items. Upon completion of the foregoing treatment, the mixture was centrifuged (81) or otherwise strained while still hot to remove undissolved fractions of the keratin. The insoluble fraction was washed with fresh solvent to remove as much as possible of the retained liquid, which was then combined with the solution that had passed through the centrifuge. It was found that the solution or liquor contained about 50% of the original keratinous material, although in the course of a number of operations it was found to contain between about 40% and 65%. The pH of the solution was adjusted to about 4.5. Upon cooling the liquor, the keratin became almost insoluble in the alcohol-water solution and was precipitated as a cheese-like, gelatinous mass in which the water and alcohol were loosely held. This mass was then centrifuged (83) or otherwise strained to remove most of the alcohol and water. The resulting cake was then washed with distilled or deionized water and dried at room temperature in the dark.

The drying operation may be carried out in any suitable way. For practical economy, the keratin was spread out in a thin layer and a fan used to blow air over the material. The resulting product was of poorer quality than that which may be obtained by the use of vacuum drying, but because of economy air drying was used. After about 12 to 16 hours' drying, the keratin was substantially dry (84) and the yield was about 150 pounds. It was found desriable to reduce the time of exposure to oxygen and to light to as short a time as feasible. It was found that keratin prepared in this manner may be stored in closed containers for long periods of time, at room temperature, until it is required for further processing.

Formation of a spinnable keratin solution, according to the present invention, from the above prepared keratin was carried out as follows:

About 150 pounds of the substantially dry keratin prepared above was mixed with about 187.5 pounds of a 50% by weight urea-in-water solution in which 8.25 pounds of sodium sulfhydrate (hydrosulfide) was dissolved. The mixing was conducted in a closed mixer to prevent loss of volatile products released by the sulfhydrate.

The resulting solution was mixed (88) and after a thorough mixing the solution was permitted to age for one-half hour at room temperature. The aging serves to allow complete penetration of the solvent solution (urea-in-water) into the keratin. If the aging step is omitted, the resulting extrusion will produce a filament tending to foam at the time of extrusion as a result of the non-homogeneity of the mixture. If the mixture is allowed to age too long (for more than about 2 to 4 hours), the resulting fibers lose their stringiness.

Spinning or extrusion of the solution, prepared as indicated above, was accomplished by placing the concentrated solution in an extruder of the type described hereinabove, and shown in Figures 5 through 8 of the appended drawings, which permitted compression of the material to eliminate occluded air and other gases. The compressed solution was then screened in the same extruder and passed into a chamber or hot zone maintained at a temperature of 110° C. The solution was then extruded (89) through an extrusion nozzle or spinnerette which was of such character as not to attack the filaments and not to become corroded by the solution. Such a spinnerette may be made of stainless steel.

The extruded filaments passing from the spinnerette were stretched sufficiently while still hot to provide for a total stretching of about 16 times in length from that at the time of extrusion to that of the final product. The stretched filaments were passing through an extraction bath (91) to remove, by leaching or extraction, some of the water and urea present in the fiber. The most satisfactory extraction bath was one containing methanol and bentonite, with about 500 grams of the latter suspended in 7 gallons of methanol. It was found preferable to have the methanol reasonably anhydrous as substantial amounts of water will cause disintegration of the fiber at this stage. The filaments were then passed through a second methanol bath (92) for further extraction followed by water sprays (93) at an elevated temperature; this was followed by stretching on a reel (94) so that each foot of filament was stretched to about one and a half times its length after the tempering treatment. This stretching step improves the "wet-stiffness" characteristics of the finished product.

The stretched fiber was then passed through a tanning solution (95), this being an aqueous solution containing 10% formaldehyde and 0.3% hydrochloric acid for hardening. The tanned (hardened) fiber was then passed through a hot air oven heated to about 120° C. (96) and further tempered or annealed by passing the fiber through a bath of steam or boiling water (97). This annealing treatment tends to make the fibers less brittle. The fiber was then air dried (98).

*Example 2*

A solution of keratin was prepared as in Example 1 substituting an equal quantity of sodium metabisulfite for the ammonium bisulfite used in Example 1. After being suitably dried, the keratin was ready for preparing an extrusion solution.

About 150 pounds of substantially anhydrous formamide was mixed with about 8.25 pounds of sodium sulfhydrate. To the mixture was added 150 pounds of the substantially dry keratin. The mixture passed through a sticky stage after which the mix became thinner but finally acquired a rubbery consistency. The mixture was aged for a half hour at room temperature and was then comminuted or subdivided to granulate the material into about ¼-inch pellets. These pellets may be stored in a freezer cabinet for an extended period of time. During storage precaution should be taken to exclude air from the material. If these precautions are maintained, the material may be stored for a substantial period of time before extrusion.

The aged mixture was then introduced into an extruder and compressed to remove entrapped gases from the solution. The solution was next passed into the hot zone of the extruder maintained at a temperature of approximately 150° C. and then passed through a spinnerette head to extrude the solution into filaments of satisfactory diameter.

The filaments from the extruder were stretched about 16 times in length upon emerging and were next passed through an extraction bath of methanol containing bentonite after which they were passed into a hot water bath. The processed fiber was then again stretched upon a reel to one and a half times its processed length. This stretched fiber was then air dried and tempered by passing it through a steam bath and then again air dried.

*Example 3*

Keratin was obtained by treating a natural source of keratin with a reducing, disulfide-splitting agent as follows (the reference numerals apply to Figures 3 and 4 of the drawings):

About 300 pounds of chicken feathers were mixed with 417 gallons of a 50% by volume solution of methyl alcohol-in-water. About 15 pounds of monothioglycol were then added and the mixture was heated in a closed vessel, formed or lined with glass, to a temperature of about 75° C. (10). The mixture was stirred while being maintained at said temperature for about 20 minutes. Care was exercised not to permit access of oxygen to the mixture in the course of this reaction. Upon the completion of the foregoing treatment, the mixture was centrifuged (11) while still hot to remove undissolved fractions of the keratin. It was found that the hot liquor solution (12) contained about 50% of the original keratinous material. On cooling of the liquor, the keratin became almost insoluble in the alcohol-water solution and was precipitated as a cheese-like gelatinous mass in which the alcohol and water were loosely held. This mass was then centrifuged (13) to remove most of the water and alcohol. The resulting cake (14) was then washed with deionized water and dried at room temperature, in the dark, preferably under vacuum.

The dried keratin was then ready for the preparation of continuous filaments which were prepared as follows:

About 150 pounds of keratin (14), produced as explained above, was thoroughly mixed with about 150 pounds of formamide containing 3.0 pounds of monothioglycol. The mixture was thoroughly mixed and aged from 1 to 4 hours (18), in repeating the procedure on a number of different batches. Since monothioglycol was used, the pH was adjusted so that when a sample of the mixture was suspended in water it had a pH in the range of 4.7 to 5.6. The optimum value appears to be about 5.2. It has been found that if the pH is not adjusted to fall within the range indicated, and one of the organic thiol type of reducing, disulfide-splitting agents is used, the fibers upon extrusion will be dull and cannot be satisfactorily drawn. It was also found desirable to cool the keratin and the formamide to about 5° C. or even lower prior to mixing. This treatment tended to overcome the resistance of the subsequent fibers to the drawing operations.

After aging, the mixture was then introduced into an extruder (19). At the time of introducing the concentrated aged solution of keratin into the extruder the material was cooled, i. e., below —5° C., and it was found preferable in a series of similar operations to have it as low as about —50° C. The keratin solution was kept cool while it was being compressed so as to eliminate entrapped air, and a clear, transparent, solid solution was formed. This was accomplished by the use of the screw-type extruder described hereinabove having the extruder barrel enclosed by a jacket through which a cooling liquid was circulated. The extruder had attached to the end of its barrel a chamber in which the solid solution was forced through a fine screen (150-mesh) of stainless steel. This chamber was maintained at a temperature of about −50° C. The screening insured removal of dirt and non-solvated particles. The screened keratin solution was then passed through a heating zone in the extruder in which the solution was heated quickly to a temperature of about 125° C. and was then forced through the extruder orifice or spinnerette.

While still hot the extruded filaments were drawn to such an extent that the length of the filaments was increased about 16 times the original extruded length. The drawn filaments were then reeled up in a 2% quinone, 2% bentonite-in-water mixture. Formaldehyde may be used to replace the quinone in this bath (71). This resulted in the tanning of the filaments which were then washed in water at room temperature (67) and thereafter passed through a water bath (68) of about 60° to 100° C. The resulting filaments were then re-dried by air drying (69).

Example 4

With about 100 pounds of the ammonium bisulfite extracted keratin produced in the first step of Example 1 there was thoroughly mixed about 100 pounds of formamide. The total mass was thoroughly mixed. After aging for 2 hours, the mixture was then introduced into an extruder and compressed to remove any entrapped gases after which the compressed mixture was passed through a fine screen. The screened mixture was then heated to a temperature of about 150° C. and forced through the extrusion nozzle or spinnerette of the extruding apparatus. The resulting filaments were then extracted, dried, stretched and tanned as in Example 1 or 2.

Example 5

To about 125 pounds of the monothioglycol extracted keratin produced in the first step of Example 3 there was added 62.5 pounds of urea dissolved in 62.5 pounds of water containing about 3.4 pounds of sodium sulfhydrate. The mass was then thoroughly mixed. After thorough mixing, the mix was permitted to age for 1½ hours. The aged mixture was introduced into an extruder and compressed to remove any occluded gas. The compressed mixture was then passed through a screen to remove any chunks of material. This screened mix was then passed through a heating chamber and heated to about 110° C. and forced through a spinnerette or extruder nozzle. The resulting filaments were then extracted, dried, stretched and tanned as in Example 1 or 2.

Example 6

To about 300 pounds of chicken feathers immersed in 415 gallons of 50% by volume of methanol in water there was added about 22.2 pounds of sodium sulfhydrate dissolved in a minimum of water. The resulting mixture had a pH of about 10.5. The mixture was heated to about 75° C. and agitated at that temperature for 40 minutes. The mixture was then centrifuged while still hot to remove the insoluble portions of the chicken feathers. The clear solution was cooled at about room temperature and the gelatinous, cheese-like precipitate which formed was removed by means of a centrifuge, washed with deionized water and dried at room temperature. The dried keratin was slightly different in character from that which is obtained by treatment with sodium metabisulfite, being more sticky and gelatinous in nature. The dried keratin was then converted into filaments in accordance with the procedure described in the second part of Example 1.

As has been discussed in the early part of this specification, the class of reagents referred to as the sulfhydrates are believed to exist as salts of the sulfhydrate (or hydrosulfide) anion (—SH−). The exact chemical state in which this reagent is utilized is not entirely known and I do not desire to be limited to a particular theory as to the form in which the reagent may exist.

A number of the sulfhydrates are available commercially, such as sodium sulfhydrate and other alkali-metal sulfhydrates. In order to illustrate the preparation of some of the sulfhydrates, the following examples are given. It is intended that the term "sulfhydrate" encompass the form or forms in which the sulfur atom exists as a result of these two methods of preparation.

Example 7

It has been calculated that 0.08 equivalent of sulfhydrate ion (—SH−) is required to react with 100 grams of keratin. This calculation uses as a basis the amount of sodium sulfhydrate actually required.

In the preparation of piperidine sulfhydrate 0.68 gram of piperidine was dissolved in 10 grams of formamide and the mixture was weighed. Hydrogen sulfide gas was passed through the mixture for one hour and the mixture weighed again. The increase in weight was 0.36 gram which was very close to the theoretically required amount of 0.37 gram. This includes the 0.10 gram which has been experimentally found to be dissolved by the formamide. On addition of 10 grams of keratin obtained from the treatment of natural keratin with sodium metasulfite in accordance with Stage One of Example 2, a successful mix resulted which on extrusion yielded a stringy filament.

Example 8

About 1 gram of lithium carbonate was placed in a porcelain boat which in turn was placed in a large diameter ignition tube. A stream of hydrogen sulfide gas was passed over the lithium carbonate which had been heated to a red heat. After 20 minutes, the boat was cooled in an atmosphere of hydrogen sulfide. This method of preparation is essentially that described in Mellor's Treatise on Inorganic Chemistry, volume 2, page 641. A calculated quantity (0.32 gram) of this material was added to 10 grams of the formamide and was completely soluble in it. This solution was mixed with 10 grams of keratin obtained from the treatment of natural keratin with sodium metasulfite in accordance with Stage One of Example 2, and upon extrusion yielded a successful stringy filament.

The keratin fibers or filaments resulting from any of the foregoing procedures are of a greatly improved character as compared with any keratin fibers heretofore produced. As hereinbefore indicated, this is believed to be due, at least in part, to the reduction of the metals content of the keratin as compared with that of the original source material, i. e., chicken feathers. By way of comparison, certain chicken feathers and also filaments produced from said feathers in accordance with the invention pursuant to the method of Example 3 hereinabove have ben subjected to spectro-chemical analysis to determine their contents of various metals. The results are indicated in the following table, in which the figures given are the approximate number of parts of the various metals per million parts of the material analyzed:

| Metal | Unwashed Chicken Feathers | Extruded Filaments of the Invention |
|---|---|---|
| Aluminum | 240 | 40 |
| Calcium | 240 | 80 |
| Copper | less than 20 | 10 |
| Iron | 300 | 75 |
| Magnesium | 200 | 30 |
| Zinc | 75 | none |

It will be seen, therefore, that a substantial reduction has been effected in the quantity of various metals present. Some have been reduced to as little as ⅙ of their original content and substantially all have been reduced to less than 1/3 of their original amounts.

The improved character of the product of the invention has also been shown by spectro-photometrical analysis which serves to indicate the degree of degradation of the protein molecules, in the course of producing the filaments, from the form in which they are found in the original source material. It is possible to observe spectro-photometrically the relative intensities of certain portions of the spectrum produced upon subjecting the materials to the cracking action of a high voltage and high current density discharge. The current used in these analyses was under a potential of 2,200 volts. The results observed were a comparison of the intensities created by certain regions of the spectrum identified with the OH and CH radicals. Thus, it was found that if a high voltage vacuum discharge is operated between hollow electrodes filled with the protein materials to be analyzed and the resultant radiation is observed spectro-photometrically, then the fibers prepared in accordance with the present invention will provide an intensity at the extreme left-hand member of the R branch of the OH bank at 3,063 Angstrom units which is somewhat weaker than or substantially equal to the intensity at the band head of the CH band at 3,143 Angstrom units. On the other hand, if the protein fibers analyzed are prepared by other processes, involving autoclaving or similar degradative procedures, it will be found that the proteins are degraded to such an extent that the intensity of the specified part of the hydroxyl band is considerably greater than that of the designated CH band. This increase in the intensity of the OH band is proportional to the relative degree of degradation of the proteins. If the band intensities are expressed in terms of a conventional logarithmic scale, then the ratio of the intensities of the bands will be expressed by the differences in the logarithmic values. The actual ratio will be the anti-logarithm of the difference indicated.

In analyzing certain chicken feathers, chicken feather protein, fibers produced in accordance with the invention, and fibers produced by other methods from chicken feathers, the following data have been obtained:

| Sample | $\log I_{OH} - \log I_{CH}$ |
| --- | --- |
| Chicken feathers | 0 |
| Chicken feather protein | 0 |
| Fibers produced by invention | 1 |
| Fibers produced from chicken feathers by other methods: | |
| A | 3 |
| B | 3 |
| C | 3 |

Thus, the actual ratio of the intensities of the designated points of the 2 bands is 1 for chicken feathers and for chicken feather protein. Due to the slight degradation of the protein brought about by the process of the invention the ratio in question has a value of 10 for the resulting filaments. The degradation resulting from the processes by which samples A, B and C were produced in much greater so that the indicated ratio of the intensities specified is of the order of 1,000.

In the foregoing analyses the fibers or filaments indicated as produced by the invention were produced in accordance with the disclosure given in Example 3 of this specification. The fibers designated A, B and C were produced by the following methods:

Fibers A and B were prepared, in separate batches by the same procedure, by mixing in a 5-gallon Pfaudler glass-lined kettle, fitted with an anchor-type stirrer, the following materials:

| | | |
| --- | --- | --- |
| Chicken feathers | lbs | 6 |
| Methyl alcohol 50% | gals | 8 |
| Hydrochloric acid | mols | 11.7 |

The mixture was cooked at 112° C. for 4 hours and was then run through cheese-cloth to remove the undissolved fractions. The pH was then adjusted to 5.8 to facilitate precipitation of the keratin which came down as a curd. This curd was pressed to about 50% solids content after which it was run through a meat chopper and dried in a stream of air at room temperature. The dry protein recovered was about 85%, by weight, of the original feathers. The dried keratin was prepared for extrusion by intermixing the following:

| | | |
| --- | --- | --- |
| Dried keratin | grams | 5 |
| Methyl Cellosolve (monomethyl ether of ethylene glycol) | cc | 0.75 |
| 0.5 molar sodium bisulfite | cc | 0.5 |
| 0.5 molar sodium sulfite | cc | 2.0 |
| Water | cc | 0.75 |

The pH of this mixture was approximately 7.7. The mixture was then fed into an extruder of the type hereinabove described in relation to Figures 5 to 8. Heating of the mixture prior to extrusion through the extrusion aperture was accomplished by circulating through a head zone, corresponding with chamber 62 of Figure 6, glycerine taken from a constant temperature bath. After extrusion the fibers or filaments were wound up on a drum without further treatment for sample B. Sample A was quinone tanned.

Sample C was prepared by treating 8 pounds of feathers with 85 cc. of concentrated hydrochloric acid and 8 pounds of 50% ethyl alcohol by volume. This mixture was autoclaved at 30 pounds' pressure at 150° C. for 4 hours. The material was filtered and the pH adjusted to 5.6 to precipitate the keratin. This was pressed at 10 tons per square inch, then broken up by a meat chopper and vacuum dried. 50 grams of the resulting dry keratin were powdered and ball-milled with 10 cc. of methyl Cellosolve, 20 cc. of 10% sodium sulfite and 20 cc. of water. The mixture was extruded at 87° C. through an extrusion nozzle to form a fiber.

A practical advantage of the lesser degradation of the keratin molecules in fibers produced in accordance with the invention, as compared with those produced by other methods, is shown by a comparison of the dry and wet tensile strengths of the fibers. Thus, fibers produced according to the invention and fibers from samples A, B and C, produced as explained above, when subjected to tensile strength determinations in a conventional manner, gave the following results:

| Fibers | Tensile Strength, lbs./sq. in. | |
| --- | --- | --- |
| | Dry | Wet |
| A | 9,400 | 3,200. |
| B | 10,100 | less than 1,500. |
| C | 8,400 | less than 1,500. |
| Made According to Invention: | | |
| Untanned | 16,000 | 5,800. |
| Tanned | 14,200 | 7,300. |

In the foregoing the fibers or filaments designated "Tanned" were subjected to the quinone tanning treatment described above.

Another respect in which the fibers or filaments produced in accordance with the invention differ from other keratin fibers is in the matter of smoothness of the exterior surface upon extrusion. Photomicrographs taken of the fibers or filaments of the invention showed these to be extremely smooth and regular on their surfaces, comparable with glass fibers. Fibers produced by other methods, on the other hand, were irregular and rough or pitted, as viewed under a microscope or shown in a photomicrograph. As magnified they gave the appearance of rope and were dull, in contrast with the smooth, glistening, light-reflecting fibers produced in accordance with the invention. This is shown by Figures 9 and 10. Referring to Figure 9, the filament illustrated at 72 is one produced according to the invention while that illustrated at 73 is one taken from batch A produced as explained above. Similarly, Figure 10 shows at 74 a filament produced according to the invention while filament 75 is a conventional glass filament.

Figure 11:
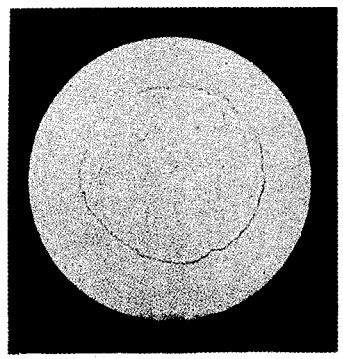
Figure 12:
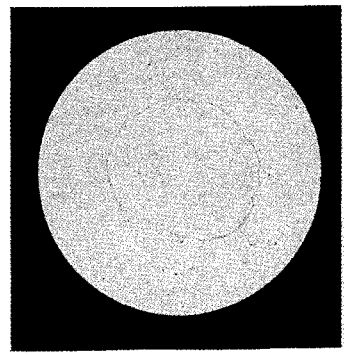
Figure 13:
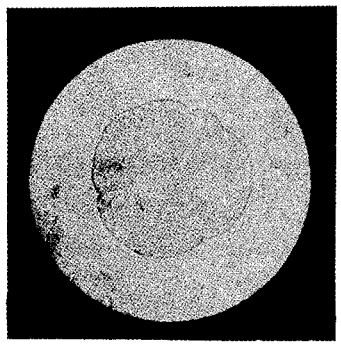
Figure 14:
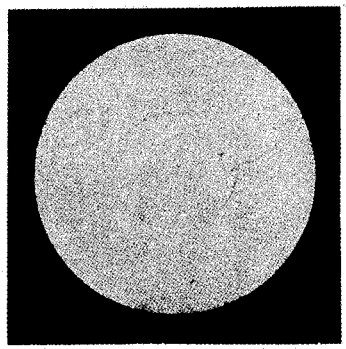

Further indication of the greater smoothness and regularity of the fibers or filaments produced by the invention as compared with other keratin fibers is given by the cross-sectional views of the fibers as shown in Figures 11 to 14, inclusive. Figures 11 to 13, inclusive, are photomicrographs showing on a greatly magnified scale the cross-sections of fibers produced by processes A, B and C, respectively, described above. Figure 14 is a similar view of the cross-section of a fiber produced according to the invention, this being of the untanned variety.

The terms and expression which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A pliable keratin fiber derived from natural source material having not more than about 50% of the content of copper, aluminum, calcium, iron and magnesium present in the keratin of the original source material.

2. A pliable keratin fiber formed by extrusion at a temperature of at least 110° C. from a concentrated solution containing at least about 25% keratin by weight, said fiber being drawn until its length is at least 16 times that of the original extruded fiber, and said fiber having a dry tensile strength of at least 12,000 pounds per square inch.

3. A pliable fiber formed of keratin derived from natural source material which is completely soluble in an equal weight of formamide with 2% by weight of monothioglycol and which is not degraded in molecular structure from the original natural source material to the extent of more than about 1 in the ratio of the logarithm of the intensity of the R branch of the OH band at 3,063 Angstrom units to that of the CH band at 3,143 Angstrom units.

4. A pliable fiber formed of keratin derived from natural source material which is capable of forming a complete solution with an equal weight of formamide with 2% by weight of monothioglycol, the keratin not being degraded in molecular structure from the original natural source material to the extent of more than about 1 in the ratio of the logarithm of the intensity of the R branch of the OH band at 3,063 Angstrom units to that of the CH band at 3,143 Angstrom units, said keratin having not more than 50% of the content of copper, aluminum, calcium, iron and magnesium present in the keratin of the original feathers.

5. A pliable keratin fiber having a smooth exterior surface comparable with that of an extruded glass fiber and formed of keratin which is not degraded in molecular structure to an extent greater than about 1 in the ratio of the logarithm of the intensity of the R branch of the OH band at 3,063 Angstrom units to that of the CH band at 3,143 Angstrom units.

6. A homogeneous, concentrated, spinnable solution of keratin substantially free from undissolved keratin, the keratin being present in high concentration, and the solvent of said solution being one from which keratin may be spun.

7. A homogeneous, concentrated, spinnable solution of keratin substantially free from undissolved keratin; the solvent of said solution being one from which keratin may be spun; the keratin being present in a quantity of at least about 30% of the weight of the solution.

8. A homogeneous, concentrated, spinnable solution of keratin substantially free from undissolved keratin; the solvent of said solution being one from which keratin may be spun; said keratin forming 40% to 60% of the solution.

9. A homogeneous, concentrated, spinnable solution of keratin substantially free from undissolved keratin; the solvent of said solution being one from which keratin may be spun; said solution containing about equal parts by weight of solvent and keratin.

10. A homogeneous, concentrated, spinnable solution of keratin substantially free from undissolved keratin; the solvent of said solution being one from which keratin may be spun and which contains an $NH_2$ substituent.

11. A homogeneous, concentrated, spinnable solution of keratin substantially free from undissolved keratin; the solvent of said solution being one from which keratin may be spun and which is a member selected from the class consisting of mono-, di- and tri-ammonia substituted analogs of formic acid, their esters and their alkanol and alkyl substituted derivatives.

12. A homogeneous, concentrated, spinnable solution of keratin substantially free from undissolved keratin; the solvent of said solution being one from which keratin may be spun and which is represented by the following formula

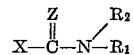

wherein X is a member selected from the group consisting of hydrogen, alkanol and alkyl groups containing not more than 3 carbon atoms, $-NR_3R_4$, $-OR$, wherein R is an alkyl group containing not more than 3 carbon atoms, and the group

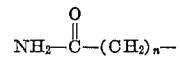

wherein $n$ is an integer selected from one and two; the groups $R_1$, $R_2$, $R_3$ and $R_4$ are members of the class consisting of hydrogen, alkyl and alkanol groups which when taken together shall contain not more than 4 carbon atoms; and Z is a member selected from the class consisting of oxygen and $=NH$.

13. An extrudable keratin solution comprising a solvent containing a sulfhydrate compound of a base possessing a dissociation constant in excess of $1 \times 10^{-5}$ and keratin which has been treated with a reducing, disulfide-splitting agent, said solvent being a nitrogen-containing compound capable of dissolving said treated keratin; said solution being capable of producing a continuous filament when extruded at elevated temperatures.

14. An extrudable keratin solution comprising a sulfhydrate compound of a base possessing a dissociation constant in excess of $1 \times 10^{-5}$, keratin which has been treated with a reducing, disulfide-splitting agent, and a nitrogen-containing solvent having the formula

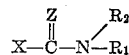

wherein X is a member of the group consisting of hydrogen, alkyl and alkanol groups containing not more than 3 carbon atoms, $-NR_3R_4$, $-OR$, wherein R is an alkyl group containing not more than 3 carbon atoms, and the group

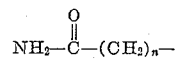

wherein $n$ is an integer selected from one and two; the groups $R_1$, $R_2$, $R_3$ and $R_4$ are members of the class consisting of hydrogen, alkyl and alkanol groups which when taken together shall contain not more than 4 carbon atoms; and Z is a member selected from the class consisting of oxygen and $=NH$.

15. A method of forming keratin fibers which comprises forming a concentrated mixture of keratin and a solvent capable of dissolving the keratin at least at elevated temperatures, said solvent containing an $NH_2$ substituent, said keratin having a substantial portion of the polyvalent metals removed from cross-linkage in the keratin molecules, heating the mixture to at least 110°

C. to provide a hot substantially complete solution of the keratin, extruding said solution, drawing the extruded fibers and removing the solvent therefrom.

16. A method of forming keratin fibers which comprises forming a concentrated mixture of keratin and a solvent capable of dissolving the keratin at least at elevated temperatures, said keratin having a substantial portion of the polyvalent metals removed from cross-linkage in the keratin molecules, heating the mixture to at least 115° C. to provide a hot substantially complete solution of the keratin, extruding said solution in fiber form, drawing the extruded fibers, and removing the solvent therefrom, said solvent being a member selected from the class consisting of mono-, di- and tri-ammonia substituted analogs of formic acid, their esters and their alkyl and alkanol substituted derivatives.

17. A method of forming keratin fibers which comprises forming a concentrated mixture of keratin and a solvent capable of dissolving the keratin at least at elevated temperatures and having the following formula

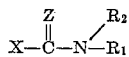

wherein X is a member of the group consisting of hydrogen, alkyl and alkanol groups containing not more than 3 carbon atoms, $-NR_3R_4$, $-OR$, wherein R is an alkyl group containing not more than 3 carbon atoms, and the group

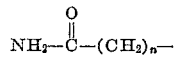

wherein $n$ is an integer selected from one and two; the groups $R_1$, $R_2$, $R_3$ and $R_4$ are members of the class consisting of hydrogen, alkyl and alkanol groups which when taken together shall contain not more than 4 carbon atoms, and Z is a member selected from the class consisting of oxygen and $=NH$, said keratin having a substantial portion of the polyvalent metals removed from cross-linkage in the keratin molecules, heating the mixture to at least 115° C. to provide a hot substantially complete solution of the keratin, extruding said solution in fiber form, drawing the extruded fibers and removing the solvent therefrom.

18. A method as defined in claim 15, wherein at least 30% by weight of the concentrated mixture is keratin.

19. A method as defined in claim 17, wherein from about 40% to 60% by weight of the concentrated mixture is keratin.

20. A method of forming keratin filaments which comprises forming a concentrated mixture of keratin, a sulfhydrate compound of a base possessing a dissociation constant in excess of $1 \times 10^{-5}$, and a solvent capable of dissolving said keratin and which is a member selected from the class consisting of mono-, di- and tri-ammonia substituted analogs of formic acid, their esters and their alkyl and alkanol substituted derivatives, heating said mixture to an elevated temperature, and extruding filaments from said mixture.

21. A method of producing an extrudable keratin solution which comprises treating keratinous material in an aqueous alcohol solution containing 20% to 60% by weight of an alcohol having not more than 4 carbon atoms in the presence of a reducing, disulfide-splitting agent to dissolve a portion of said material, separating the solution from residual solids, recovering the keratin from said solution, and dissolving said recovered keratin in sufficient quantity in a solvent from which the keratin is capable of extrusion at least at elevated temperatures to comprise at least 30% by weight of the resulting solution.

22. A method of producing an extrudable keratin solution which comprises treating keratinous material in an aqueous alcohol solution containing 20% to 60% by weight of an alcohol having not more than 4 carbon atoms in the presence of a reducing, disulfide-splitting agent to dissolve a portion of said material, separating the solution from residual solids, recovering the keratin from said solution, and dissolving said recovered keratin in a solvent from which the keratin is capable of extrusion at least at elevated temperatures in the presence of keratin solubilizing agent, the keratin forming at least 30% by weight of the resulting solution.

23. A method of producing an extrudable keratin solution which comprises treating keratinous material in an aqueous alcohol solution containing 20% to 60% by weight of an alcohol having not more than 4 carbon atoms in the presence of a reducing, disulfide-splitting agent to dissolve a portion of said material, separating the solution from residual solids, recovering the keratin from said solution, and dissolving said recovered keratin in a solvent from which the keratin is capable of extrusion at least at elevated temperatures, said solvent being a member selected from the class consisting of mono-, di and tri-ammonia substituted analogs of formic acid, their esters and their alkyl and alkanol substituted derivatives, said recovered keratin forming at least 30% by weight of the resulting solution.

24. A method of producing an extrudable keratin solution which comprises treating keratinous material in an aqueous alcohol solution containing 20% to 60% by weight of an alcohol having not more than 4 carbon atoms in the presence of a reducing, disulfide-splitting agent to dissolve a portion of said material, separating the solution from residual solids, recovering the keratin from said solution, and dissolving said recovered keratin in a solvent from which the keratin is capable of extrusion at least at elevated temperatures in the presence of a sulfhydrated compound of a base having a dissociation constant in excess of $1 \times 10^{-5}$, said recovered keratin forming at least 30% by weight of the resulting solution.

25. A method of producing an extrudable keratin solution which comprises treating keratinous material in an aqueous alcohol solution containing 20% to 60% by weight of an alcohol having not more than 4 carbon atoms in the presence of a reducing, disulfide-splitting agent to dissolve a portion of said material, separating the solution from residual solids, recovering the keratin in a substantially dry state from said solution, and dissolving said recovered keratin in a solvent selected from the class consisting of mono-, di- and tri-ammonia substituted analogs of formic acid, their esters and their alkyl and alkanol substituted derivatives, in the presence of at least one keratin solubilizing agent, said recovered keratin forming from about 40% to 60% of the weight of the resulting solution.

26. A spinnable keratin solution containing about 50% keratin by weight in a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, the pH of said solution being between 4.7 and 5.6.

27. A spinnable keratin solution containing about 50% keratin by weight in a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, the pH of said solution being between 4.7 and 5.6, the keratin molecules in said solution having less of the polyvalent metals crosslinked therein than in naturally occurring keratinous materials.

28. A spinnable keratin solution containing about 90% to 110% by weight of keratin per weight of a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, the pH of said solution being between 4.7 and 5.6.

29. A spinnable keratin solution containing about 90% to 110% by weight of keratin per weight of a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, the pH of said solution being between 4.7 and 5.6, the keratin molecules in said solution having less of the polyvalent metals crosslinked therein than in naturally occurring keratinous materials.

30. A spinnable keratin solution containing keratin in high concentration in a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, the pH of said solution being between 4.7 and 5.6.

31. A spinnable keratin solution containing keratin in high concentration in a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, the pH of said solution being between 4.7 and 5.6, the keratin molecules in said solution having less of the polyvalent metals crosslinked therein than in naturally occurring keratinous materials.

32. A method of forming keratin fibers which comprises extracting readily soluble keratin from keratinous material, drying the extracted keratin, forming a concentrated mixture of the dried keratin in an agent capable of dissolving the keratin at least at elevated temperatures, said agent containing an $NH_2$ substituent, said mixture having a pH between 4.7 and 5.6, the keratin comprising about 50% of the mixture, compressing the mixture at a temperature below $-5°$ C. to remove air, then heating the mixture to at least 115° C. to provide a hot substantially complete solution of the keratin and spinning the solution at such elevated temperature, drawing the spun fibers, and removing the solvent therefrom.

33. A method of forming keratin fibers which comprises extracting readily soluble keratin from keratinous material, drying the extracted keratin, forming a concentrated mixture of the dried keratin with a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, sufficient solvent being added to provide a hot substantially complete solution of keratin at a temperature of about 115° C., adjusting the pH of the mixture to between 4.7 and 5.6, compressing the mixture at a temperature below $-5°$ C. to remove air, then heating the mixture to a temperature of at least 115° C. to provide a hot substantially complete solution of the keratin and spinning the resulting solution at such elevated temperature, drawing the spun fibers, and removing the solvent therefrom.

34. A method of forming keratin fibers which comprises extracting readily soluble keratin from keratinous material, drying the extracted keratin, forming a concentrated mixture of the dried keratin at a temperature of about 5° C. with a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, sufficient solvent being added to provide a hot substantially complete solution of the keratin at a temperature of about 115° C., adjusting the pH of the mixture to between 4.7 and 5.6, compressing the solution at a temperature below $-5°$ C. to remove air, then heating the mixture to a temperature which provides a hot substantially complete solution of the keratins and spinning the solution at such elevated temperature, drawing the spun fibers, and removing the solvent therefrom.

35. A method of forming keratin fibers which comprises extracting readily soluble keratin from keratinous material, drying the extracted keratin, forming a concentrated mixture of the dried keratin with a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, adding to said mixture one or more agents capable of reducing the —S—S— bonds and of combining with the metals in the keratin molecules to form stable compounds separate from the keratin molecules, a sufficient quantity of said solvent and of said agents being added to provide a hot substantially complete solution of the keratin at a temperature of about 115° C., adjusting the pH of the mixture to between 4.7 and 5.6, compressing the mixture at a temperature between $-5°$ C. and $-50°$ C. to remove air, then heating the mixture to a temperature of at least 115° C. to provide a hot substantially complete solution of the keratin and spinning the resulting solution at such elevated temperature, drawing the spun fibers, and removing the solvent therefrom.

36. A method of forming keratin fibers which comprises extracting readily soluble keratin from keratinous material, drying the extracted keratin, forming a concentrated mixture of the dried keratin at a temperature of about 5° C. with a solvent selected from the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, sufficient solvent being added to provide a hot substantially complete solution of the keratin at a temperature of about 115° C., adjusting the pH of the mixture to between 4.7 and 5.6, compressing the mixture at a temperature below $-5°$ C. to remove air, then heating the mixture to a temperature of between 115° and 130° C. within less than 12 seconds and immediately spinning the same.

37. A method of forming keratin fibers which comprises extracting readily soluble keratin from keratinous material, drying the extracted keratin, forming a concentrated mixture of the dried keratin and an agent capable of completely dissolving the keratin at least at elevated temperatures, said agent containing an $NH_2$ substituent, said mixture having a pH between 4.7 and 5.6, compressing the mixture at a temperature below $-5°$ C. to remove air, then heating the mixture to a temperature which provides a hot substantially complete solution of the keratin and spinning the resulting solution at such elevated temperature, drawing the spun fibers, removing the solvent therefrom, tempering the spun fibers by treating the same with water at a temperature of from 60° to 100° C., and then drying the fibers.

38. A method of forming keratin fibers which comprises extracting readily soluble keratin from keratinous material, drying the extracted keratin, forming a concentrated mixture of the dried keratin and an agent capable of completely dissolving the keratin at least at elevated temperatures, said agent containing an $NH_2$ substituent, said mixture having a pH of between 4.7 and 5.6 compressing the mixture at a temperature below $-5°$ C. to remove air, then heating the mixture to a temperature which provides a hot substantially complete solution of the keratin and spinning the resulting solution at such elevated temperature, drawing the spun fibers, removing the solvent therefrom, tanning the spun fibers in cold water substantially saturated with quinone, then tempering spun fibers by treating the same with water at a temperature of from 60° to 100° C., and then drying the fibers.

39. A method of forming keratin fibers which comprises extracting readily soluble keratin from keratinous materials, drying the extracted keratin, forming a concentrated mixture of the dried keratin and an agent capable of completely dissolving the keratin at least at elevated temperatures, said agent containing an $NH_2$ substituent, said mixture having a pH between 4.7 and 5.6, compressing the mixture at a temperature below −5° C. to remove air, then heating the mixture to a temperature which provides a hot substantially complete solution of the keratin and spinning the resulting solution at such elevated temperature, drawing the spun fibers, removing the solvent therefrom, tanning the spun fibers in cold water containing small amounts of bentonite and quinone, then tempering the spun fibers by treating the same with water at a temperature of from 60° to 100° C., and then drying the fibers.

40. A method of producing an extrudable keratin solution which comprises treating keratinous material in an aqueous alcohol solution containing 25% to 60% by weight of an alcohol having not more than 4 carbon atoms in the presence of a reducing disulfide-splitting agent to dissolve a portion of the same, separating the solution from residual solids, recovering the keratin in a substantially dry state from said solution, and dissolving said recovered keratin in the substantial absence of water in a solvent of the group consisting of amides having less than 3 carbon atoms, and mono- and di-alkanol- and alkylamides, the acyl residues of which have less than 3 carbon atoms and the alkanol and alkyl groups of which have not more than 4 carbon atoms in the presence of at least one agent capable of breaking the —S—S— bonds of the keratin by a reducing action, the solvent being employed to the extent of 90% to 100% of the weight of the keratin.

41. A method of producing an extrudable keratin solution which comprises treating keratinous material in an aqueous alcohol solution containing 25% to 60% by weight of an alcohol having not more than 4 carbon atoms in the presence of a sulfur-containing reducing disulfide-splitting agent to dissolve a portion of the same, separating the solution from residual solids, recovering the keratin in a substantially dry state from said solution, and dissolving said recovered keratin in the substantial absence of water in a solvent of the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms in the presence of at least one agent capable of breaking the —S—S— bonds of the keratin by a reducing action and of combining with polyvalent metals in the keratin to permanently remove the same from the keratin molecules, the solvent being employed to the extent of 90% to 110% of the weight of the keratin.

42. A method of producing an extrudable keratin solution which comprises treating keratinous material in a mixture of 25% to 60% by weight of an alcohol containing not more than 4 carbon atoms dissolved in water in the presence of a relatively small amount of monothioglycol to dissolve a portion of the same, separating the solution from residual solids, recovering the keratin in a substantially dry state from said solution, and dissolving said recovered keratin in the substantial absence of water in a solvent of the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms in the presence of at least one agent capable of breaking the —S—S— bonds of the keratin by a reducing action and of combining with polyvalent metals in the keratin to permanently remove the same from the keratin molecules, the solvent being employed to the extent of 90% to 110% of the weight of the keratin.

43. A method of producing an extrudable keratin solution which comprises treating keratinous materials in an aqueous solution of 25% to 60% by weight of an alcohol containing not more than 4 carbon atoms in the presence of a sulfur-containing reducing disulfide-splitting agent to dissolve a portion of the same, separating the solution from residual solids, recovering the keratin in a substantially dry state from said solution, and dissolving said recovered keratin in the substantial absence of water in a solvent of the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms in the presence of at least one agent capable of breaking the —S—S— bonds of the keratin by a reducing action, the solvent being employed to the extent of 90% to 110% of the weight of the keratin.

44. A method of producing an extrudable keratin solution which comprises treating keratinous material with a mixture of 25% to 60% by weight of ethyl alcohol in water containing a small amount of reducing disulfide-splitting organic thiol at a temperature of about 75° C. until a substantial portion of the keratin is dissolved, separating the solution from the residual material, recovering the keratin from the solution in a substantially dry state, and dissolving said recovered keratin in the substantial absence of water in a solvent of the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, said solvent containing a relatively small amount of an organic thiol and being used in such amount as to form a concentrated solution of keratin.

45. A method of producing a spinnable keratin solution which comprises extracting keratin from natural keratinous material by a 25% to 60% by weight of an alcohol containing not more than 4 carbon atoms in water solution containing monothioglycol, precipitating the extracted keratin from said solution, drying the same, dissolving the dried keratin in the substantial absence of water in a quantity of a solvent of the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, said solvent being employed in an amount about equal to the weight of the keratin and containing a relatively small amount of an organic thiol, and adjusting the pH of the resulting solution to between 4.7 and 5.6.

46. A method of producing a spinnable keratin solution which comprises extracting keratin from natural keratinous material by a 25% to 60% by weight of an alcohol containing not more than 4 carbon atoms in water solution containing monothioglycol, precipitiating the extracted keratin from said solution, drying the same, cooling the died keratin to a temperature of about 5° C., dissolving the dried and cooled keratin in the substantial absence of water in a quantity of a solvent of the group consisting of amides having less than 3 carbon atoms, and mono- and di-alkanol- and alkyl-amides, the acyl residues of which have less than 3 carbon atoms and the alkanol and alkyl groups of which have not more than 4 carbon atoms, said solvent being employed in an amount about equal to the weight of the keratin, maintaining said mixture at a temperature of below about −5° C., providing in said mixture a relatively small amount of an organic thiol, and adjusting the pH of the resulting solution to between 4.7 and 5.6.

47. A process according to claim 41 in which the alcohol is present in an aqueous solution in a concentration of about 50%.

48. A process according to claim 43 in which the alcohol is present in an aqueous solution in a concentration of about 50%.

49. A process according to claim 41 wherein the alcohol is methyl alcohol.

50. A process according to claim 41 wherein the alcohol is ethyl alcohol.

51. A process according to claim 44 in which the ethyl alcohol is replaced by methyl alcohol.

52. A process according to claim 46 in which the alcohol is present in the aqueous solution in a concentration of about 50%.

References Cited in the file of this patent

UNITED STATES PATENTS

| | | |
|---|---|---|
| 922,692 | Goldsmith | May 25, 1909 |
| 2,436,156 | Upson | Feb. 17, 1948 |
| 2,445,028 | Jones | July 13, 1948 |
| 2,542,984 | Binkley | Feb. 27, 1951 |
| 2,584,123 | Gruenwald | Feb. 5, 1952 |
| 2,622,036 | Alexander et al. | Dec. 16, 1952 |

FOREIGN PATENTS

| | | |
|---|---|---|
| 538,338 | Great Britain | July 30, 1941 |